US011767091B2

(12) United States Patent
Lin et al.

(10) Patent No.: US 11,767,091 B2
(45) Date of Patent: Sep. 26, 2023

(54) COLLAPSIBLE UNDERWATER MOTIVE DEVICE

(71) Applicant: Stallion Sport Limited, Kowloon (HK)

(72) Inventors: Joseph Lin, Carson, CA (US); Kwong Keung Tung, Kowloon (HK); Ping Wai Lee, N.T. (HK)

(73) Assignee: Stallion Sport Limited, Hong Kong (HK)

( * ) Notice: Subject to any disclaimer, the term of this patent is extended or adjusted under 35 U.S.C. 154(b) by 85 days.

(21) Appl. No.: 17/527,913

(22) Filed: Nov. 16, 2021

(65) Prior Publication Data

US 2023/0150629 A1 May 18, 2023

(51) Int. Cl.
| | |
|---|---|
| *B63C 11/46* | (2006.01) |
| *B63G 8/08* | (2006.01) |
| *H02K 5/132* | (2006.01) |
| *B63H 11/08* | (2006.01) |
| *B63G 8/04* | (2006.01) |

(52) U.S. Cl.
CPC ............... *B63G 8/08* (2013.01); *B63C 11/46* (2013.01); *B63G 8/04* (2013.01); *B63H 11/08* (2013.01); *H02K 5/132* (2013.01)

(58) Field of Classification Search
CPC .. B63C 11/46; B63G 8/08; B63G 8/04; B63H 11/08
See application file for complete search history.

(56) References Cited

U.S. PATENT DOCUMENTS

| | | | | |
|---|---|---|---|---|
| 2012/0309241 | A1* | 12/2012 | Yeo | B63C 11/46 440/49 |
| 2013/0291781 | A1* | 11/2013 | Myers | B63C 11/46 114/315 |
| 2021/0171170 | A1* | 6/2021 | Chen | A63B 35/12 |
| 2021/0347454 | A1* | 11/2021 | Xiong | B63C 11/46 |
| 2022/0055727 | A1* | 2/2022 | Robinson | B63C 11/46 |
| 2022/0081081 | A1* | 3/2022 | Wei | B63C 11/02 |

FOREIGN PATENT DOCUMENTS

| | | | | |
|---|---|---|---|---|
| CN | 113697078 B | * | 6/2022 | |
| EP | 2946996 A1 | * | 11/2015 | B63B 17/00 |
| WO | WO-2019242690 A1 | * | 12/2019 | B63C 11/02 |

* cited by examiner

*Primary Examiner* — Andrew Polay
(74) *Attorney, Agent, or Firm* — Raymond Sun

(57) ABSTRACT

A sea scooter has a main housing, a left arm pivotably attached to the left side of the main housing, a right arm pivotably attached to the right side of the main housing, a left barrel secured to the left arm, and a right barrel secured to the right arm. Each barrel has a fan and a motor for propelling the sea scooter through water. The left and right arms are locked by the first and second locking assemblies into a folded configuration against the left and right sides of the main housing when the sea scooter is not in use, and the left and right arms are pivoted away from the left and right sides of the main housing in a use configuration when the sea scooter is in use in the water. The motor is sand-proof and water-proof.

6 Claims, 26 Drawing Sheets

COLLAPSIBLE UNDERWATER MOTIVE DEVICE

BACKGROUND OF THE INVENTION

1. Field of the Invention

The present invention relates to underwater motive devices, and more particularly relates to an underwater motive device that can be folded into a compact configuration for storage and transportation, and which incorporates a waterproof motor.

2. Description of the Prior Art

Underwater motive devices have been known for the last several decades. Most of those earlier devices were metal. As a result, the underwater motive devices were large and bulky. The early underwater motive devices were also expensive and heavy. Thus, the only effective market was professional divers because of both the cost and strength required to handle the unit under water.

Recent underwater motive devices have been made to be smaller and lighter, and more convenient for use. Recent improvements in underwater motive devices have also related to the safety of operation, including a slight delay in starting to prevent inadvertent operation. In addition, sealed chambers have been introduced to keep water out of the battery and motor compartments.

However, for small motive devices, providing an integral housing complete with sealing of the battery and motor compartment has proved difficult for users to easily access the battery and motor compartment. The only alternative to a strong seal was unacceptable as a weaker seal would cause the taking of the device to depth to result in cyclical pressure leakage. Where the device is used in salt water, even the slightest leakage can be disastrous. In addition, the presence of salt in any water that leaks inside can erode the metal wires, the housing and the magnet.

Waterproofing the motor is especially important, so there is a need for a waterproof motor that can be used with an underwater motive devices.

In addition, there still remains a need for an underwater motive device which is lightweight and compact.

SUMMARY OF THE DISCLOSURE

It is an object of the present invention to provide an underwater motive device that can be folded or collapsed into a compact configuration for storage and transportation.

It is another object of the present invention to provide a waterproof motor that can be used with an underwater motive device.

In order to accomplish the objects of the present invention, there is provided a sea scooter that has a main housing, a left arm pivotably attached to the left side of the main housing, a right arm pivotably attached to the right side of the main housing, a left barrel secured to the left arm, a right barrel secured to the right arm, a first locking assembly that locks the left arm against the left side of the main housing, and a second locking assembly that locks the right arm against the right side of the main housing. Each barrel has a fan and a motor for propelling the sea scooter through water. The left and right arms are locked by the first and second locking assemblies into a folded configuration against the left and right sides of the main housing when the sea scooter is not in use, and the left and right arms are pivoted away from the left and right sides of the main housing in a use configuration when the sea scooter is in use in the water.

The present invention also provides a motor that is sand-proof and water-proof.

DETAILED DESCRIPTION OF THE PREFERRED EMBODIMENTS

Figure 1:
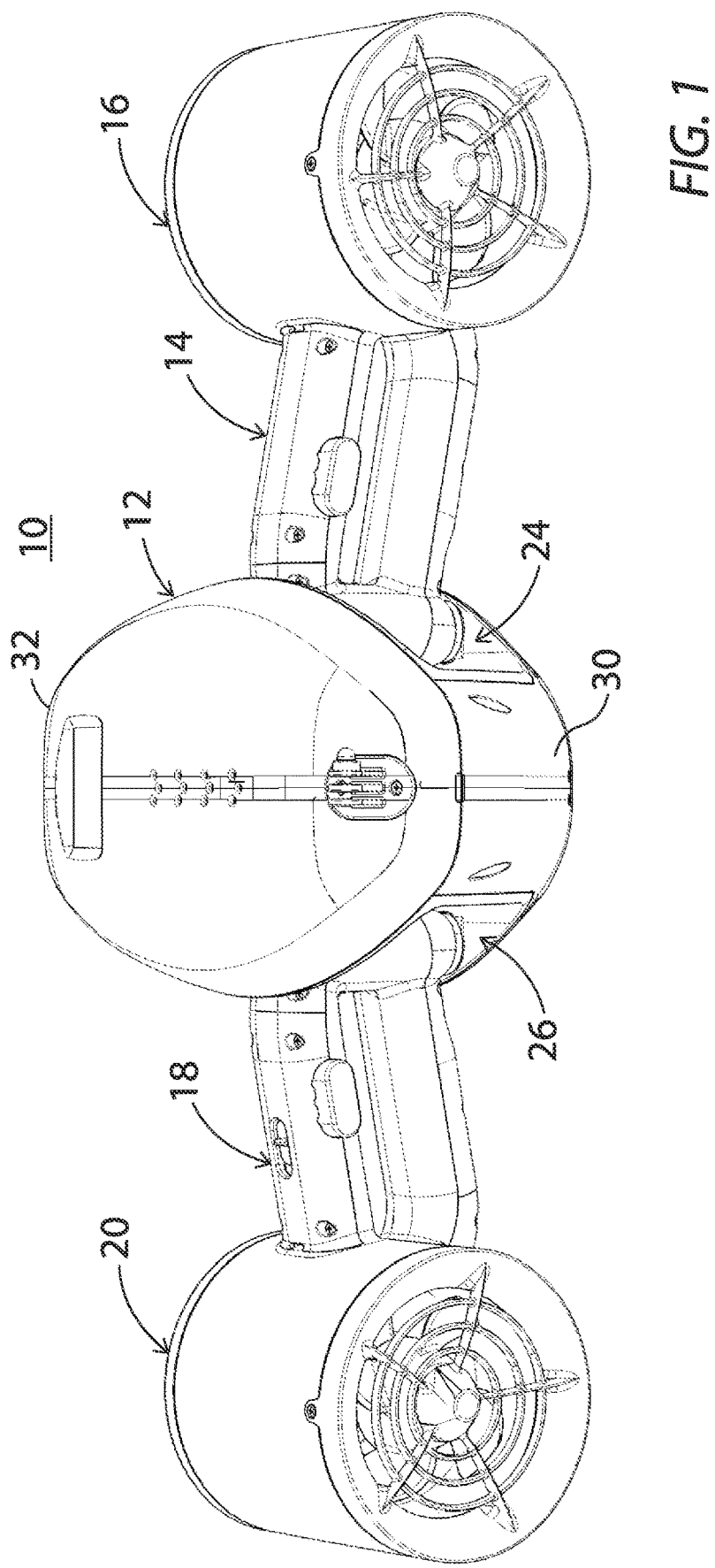
FIG. 1 is a perspective view of an underwater motive device according to one embodiment of the present invention shown in a deployed configuration.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides an underwater motive device that can be folded or collapsed into a compact configuration for storage and transportation. The underwater motive device can be a sea scooter 10. Referring first to FIGS. 1-4, the sea scooter 10 has a main housing 12, a first (left) arm 14 that pivotably couples a first barrel 16 to one side of the main housing 12, and a second (right) arm 18 that pivotably couples a second barrel 20 to the other side of the main housing 12. A locking assembly 22 (see FIG. 2, and shown in greater detail in FIGS. 5-9) functions to lock the arms 14, 18 against the main housing 12 in the folded configuration shown in FIG. 2, and to release the arms 14, 18 so that the arms can be pivoted to the deployed configuration shown in FIG. 1.

The main housing 12 houses or retains the PCB (printed circuit board), the battery (not shown), and other electronics that power and control the underwater motive device 10. Switches (not shown) can be provided on the either the main housing 12 and/or the arms 14, 18 for turning the power supply on or off, and for controlling the operation of the underwater motive device 10. The structure and operation of these components are well-known to a person skilled in the art and shall not be shown or described in greater detail herein. The main housing 12 has an external left cavity 24 provided along the left side thereof for receiving an inner end of the first arm 14, and an external right cavity 26 provided along the right side thereof for receiving an inner end of the second arm 18. The inner end of each arm 14, 18 has a pivot shaft 28 (see FIGS. 3 and 4) that is pivotably secured inside the respective cavity 24, 26, and facilitates the manual pivoting of the arms 14, 18 between the two configurations. The left and right sides of the main housing 12 can be slightly curved, the front end 30 of the main housing 12 can be generally rounded, and the rear end 32 can be either straight or curved so that the overall configuration for the main housing 12 can be generally streamlined for better hydrodynamic effect as it travels through the water.

The arms 14 and 18 can be identical, each arm 14, 18 can be configured to have a joint 34 which retains the pivot shaft 28, two handle bars 36 and 38 which extend from the joint 34, and each bar 36 and 38 having an outer end that is connected to the respective barrel 16 and 20. Each bar 38 can be hollow or define an internal bore so that cables can extend therethrough from the main housing 12 to the barrel 16 and 20. For example, cables 42 can be used to connect the PCB and the motor 80, while another cable 44 can be used to connect the PCB with a magnetic sensor 46 that is secured inside the barrel 16, 20. The magnetic sensor 46 functions to detect whether the front cover 52 of a barrel 16, 20 is removed. In this regard, a magnet (not shown) is fixed in a same axis of the magnetic sensor 46 in the front cover 52, and once the front cover 52 is removed, then the PCB will function to turn off the motors 80 in the barrels 16, 20. This is a safety feature to avoid the high-speed turning propeller 84 from cutting fingers without the protection of the front cover 52. In addition, another safety feature is provided with the PCB of the underwater motive device functioning to detect the operating current to identify whether the barrels 16 and 20 are outside water, and shutting off the motors 80 if the barrels 16, 20 are outside water.

The arms 14 and 18 also function as handles for a user to grip the underwater motive device 10 when travelling in the water.

The barrels 16 and 20 can be identical, and each barrel 16 and 20 has a generally cylindrical housing 50, with a front cover 52 and a rear cover 54 that are secured to opposite ends of the cylindrical housing 50 via screws 56. The cylindrical housing 50 has an annular channel 58 that surrounds an internal bore 60. The annular channel 58 functions as a buoyancy chamber, and is closed at the front end 62 of the cylindrical housing 50 but opened at the rear end 64 of the cylindrical housing 50. A plurality of screw posts or fixing shafts 66 extend longitudinally inside the annular channel 58, and are spaced-apart from each other. A fixing ledge 70 extends from the inner wall inside the bore 60 to support the motor 80. The ledge 70 has a mounting platform 72 that is adapted to receive and secure the motor 80 (via screws 78) at a longitudinally centered position inside the bore 60.

An annular foam piece 74 is adapted to be received inside the annular channel 58. The foam piece 74 provides buoyancy, and can have grooves 76 for receiving the fixing shafts 66 so as to secure the foam piece 74 inside the annular channel 58.

The motor 80 can be any conventional motor, or the waterproof motor 80 described in greater detail hereinbelow in connection with FIGS. 16-18. A propeller or fan 84 can be threadably secured to the motor shaft 82 which extends from the motor 80 through an opening in the mounting platform 72, with a nut 86 used to secure the fan 84 to the motor shaft 82. A drive pin 85 connects the motor shaft 82 to the motor 80 to drive the motor shaft 82 and propeller 84 to turn and stop. A magnet 88 is secured on the front cover 52. The magnet 88 in each barrel 16 and 20 attracts the other magnet 88 to keep the two barrels 16 and 20 folded against each other in the folded configuration shown in FIG. 2. Instead of magnets 88, other securement mechanisms can also be used, such as hooks and straps.

Referring to FIGS. 2 and 5-9, a locking assembly 22 functions to lock each of the arms 14, 18 against the main housing 12. The arms 14 and 18 can be pivoted to assume one of two configurations, a folded configuration shown in FIG. 2, and to a deployed configuration shown in FIG. 1. The locking assembly 22 includes a hook 90 and a buckle 92. The hook 90 is adapted to be secured to the joint 34 and moves with the arm 14 or 18. The buckle 92 is secured to the left side or the right side of the main housing 12, and does not move with the arm 14 or 18. The hook 90 has a plate with a curved or overturned side 94 that forms the hook shape to function as a catch 94, and two mounting holes 96 that receive screws 98 that secure the plate to the joint 34. See FIG. 8.

The buckle 92 itself has a latch 100 and a lock lever 102 that operate to engage and disengage the hook 90. The latch 100 has a latch body or box 104, a compression spring 106 retained inside the box 104, and a U-shaped pin bracket 108 that is inserted inside the box 104. The two arms 112 of the U-shaped pin bracket 108 extend out through the front end of the box 104, and a latch pin 110 is secured through openings at the two free ends of the arms 112. A pair of aligned opposing openings 114 are provided in the top and bottom sides of the box 104.

Figure 7:
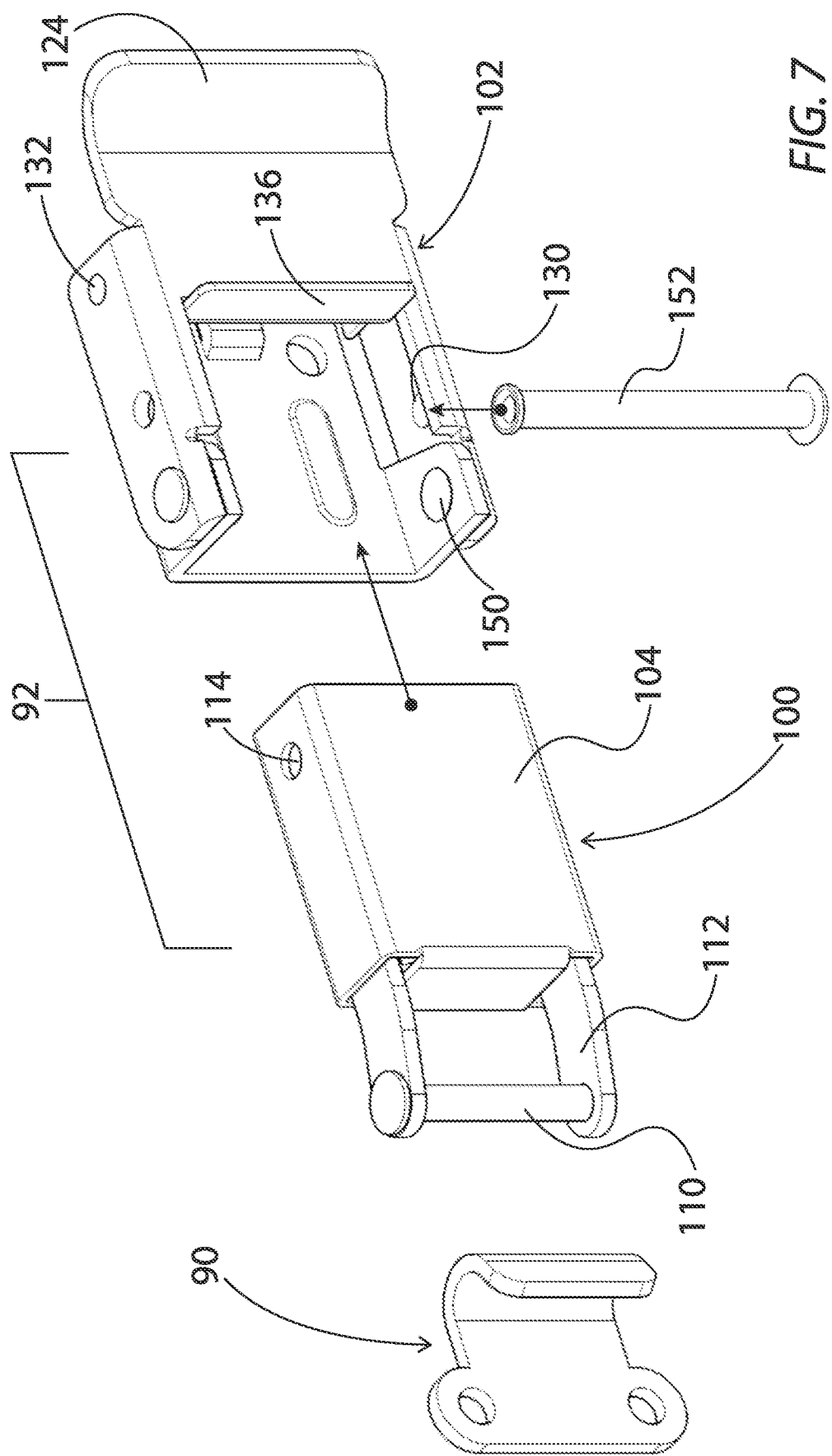
FIG. 7 is an exploded perspective of the lock and the latch of the locking assembly of FIGS. 5 and 6.
Figure 8:
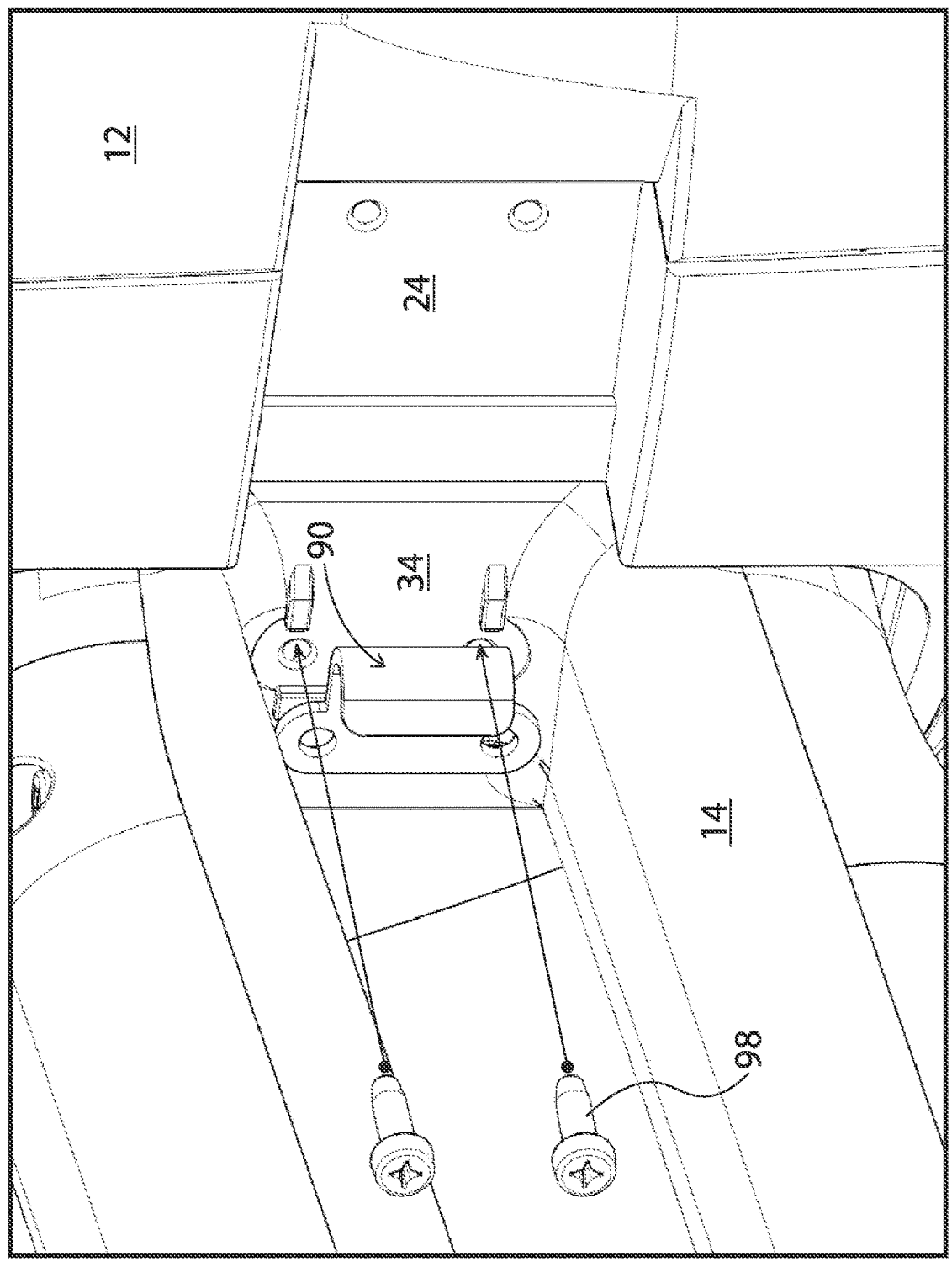
FIG. 8 illustrates how the hook is secured to an arm.

The lock lever 102 has a side plate 118 that has two opposite (top and bottom) flanges 116, with an opening 120 in each flange 116. The lock lever 102 also includes a handle latch 122 that has a handle plate 124 with two opposite (top and bottom) wings 126 extending therefrom. Each wing 126 has three openings, a first opening 128 closest to the free end of each wing 126, a third opening 132 closest to the handle plate 124, and a second middle opening 130 between the other two openings 128 and 132. The lock lever 102 further includes a lock piece 134 that is generally rectangular in configuration with a transverse flange 136 that functions as a safety lock. A torsion spring 138 is retained inside the rectangular lock piece 134 by a lock pivot pin 140. The lock piece 134 is abutted against the inner edge 144 of the handle plate 124 with the flange 136 abutting against the inner edge 144 and extending transverse to the handle plate 124, and with the lock piece 134 positioned inside the latch 122 and between the wings 126 (see FIG. 13A). The lock pivot pin 140 extends through the openings 132 and the interior of the rectangular lock piece 134, and through the torsion spring 138, to retain the lock piece 134 against the handle plate 124. Lock bolts 150 extend through the openings 120 (in the flanges 116) and the openings 128 (of the wings 126) to pivotably secure the side plate 118 to the handle latch 122. Finally, a latch pivot pin 152 extends through the openings 114 in the box and the openings 130 in the wings 126, to pivotably secure the box 104 to the latch 122. This is best shown in FIG. 7.

Figure 9:
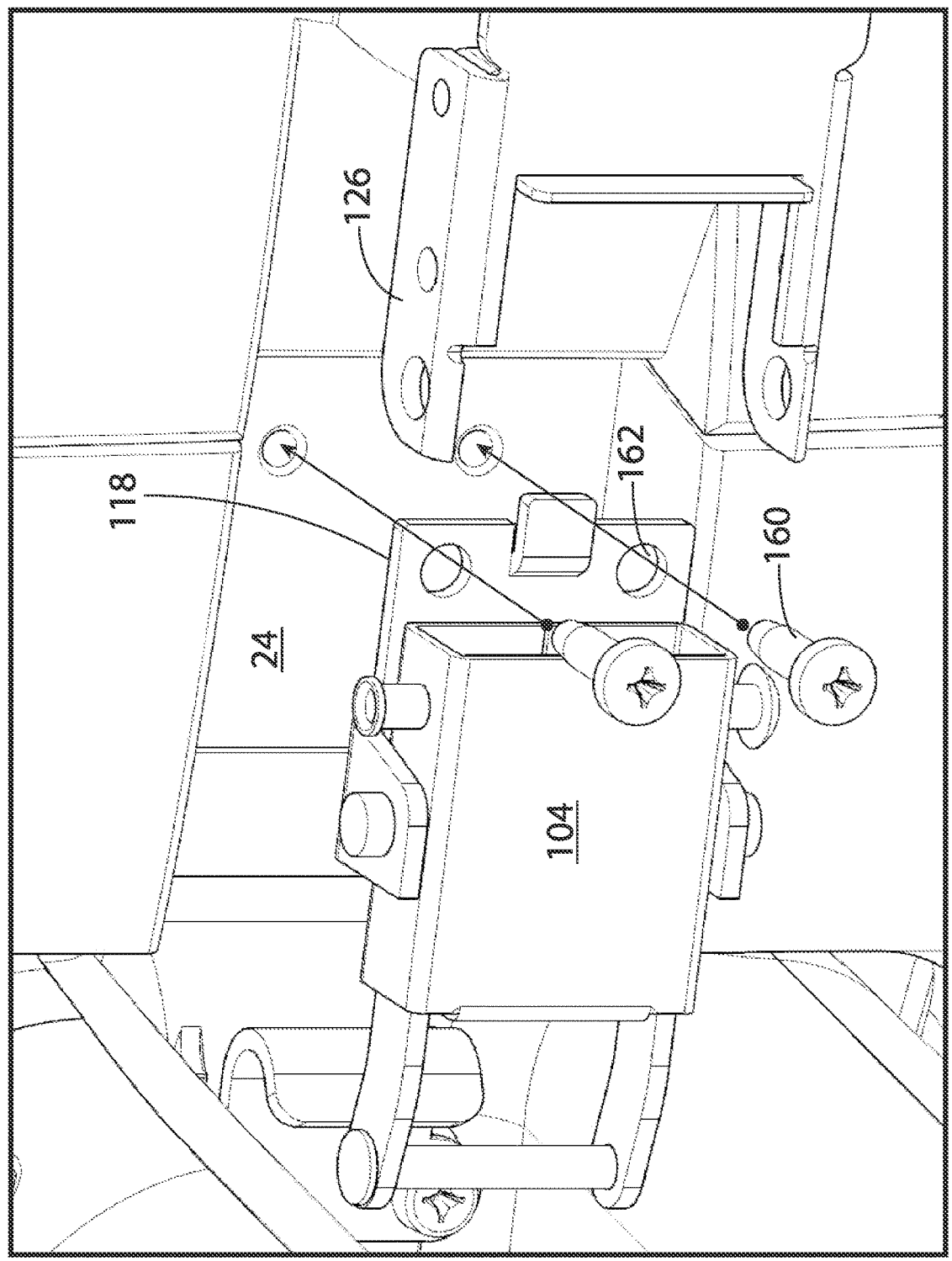
FIG. 9 illustrates how the buckle is secured to the main housing.
Figure 10A:
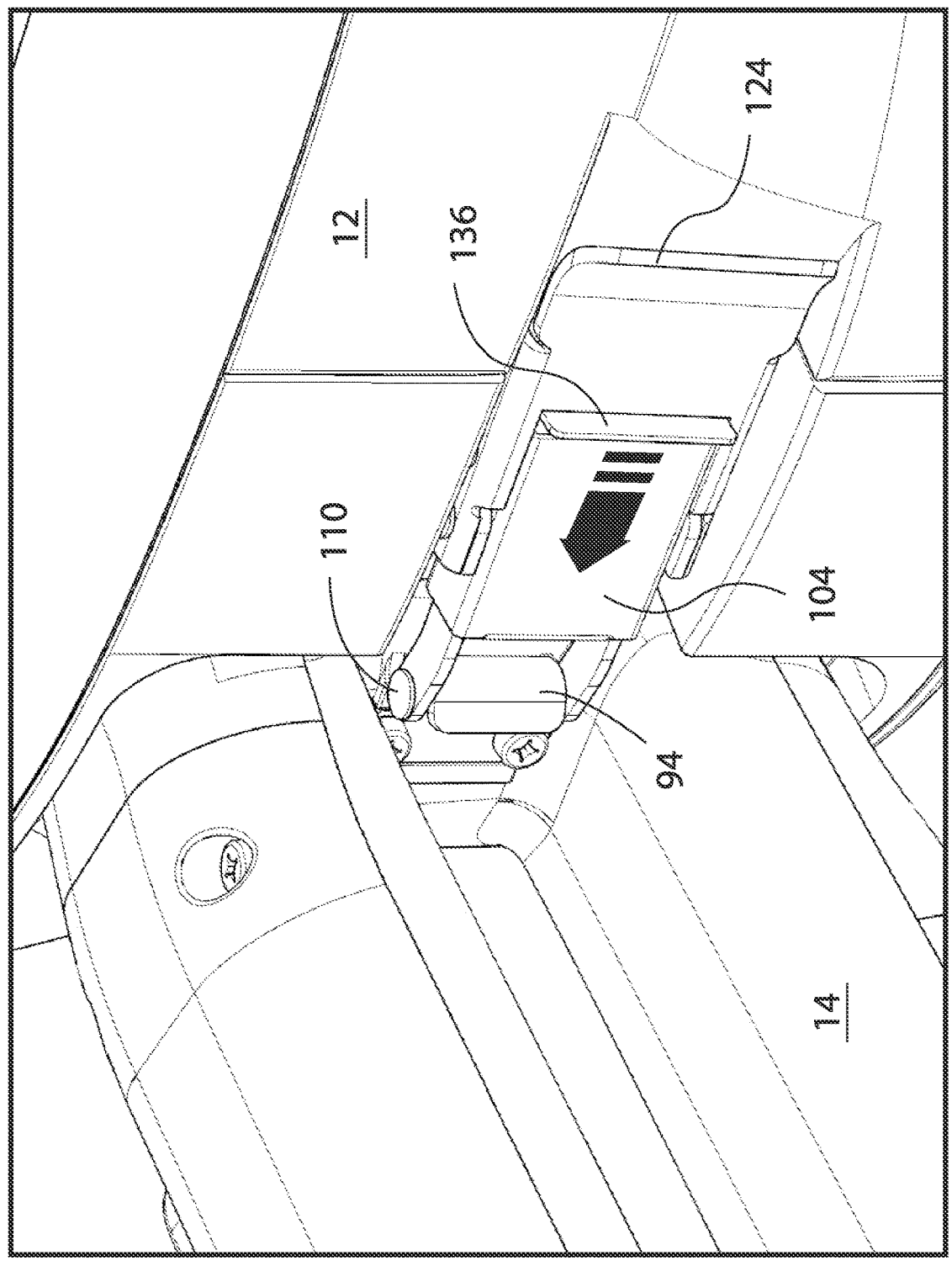
FIGS. 10A, 11A, 12A, 13A, 14A and 15A are perspective views illustrating the operation of the locking assembly of FIG. 5.
Figure 10B:
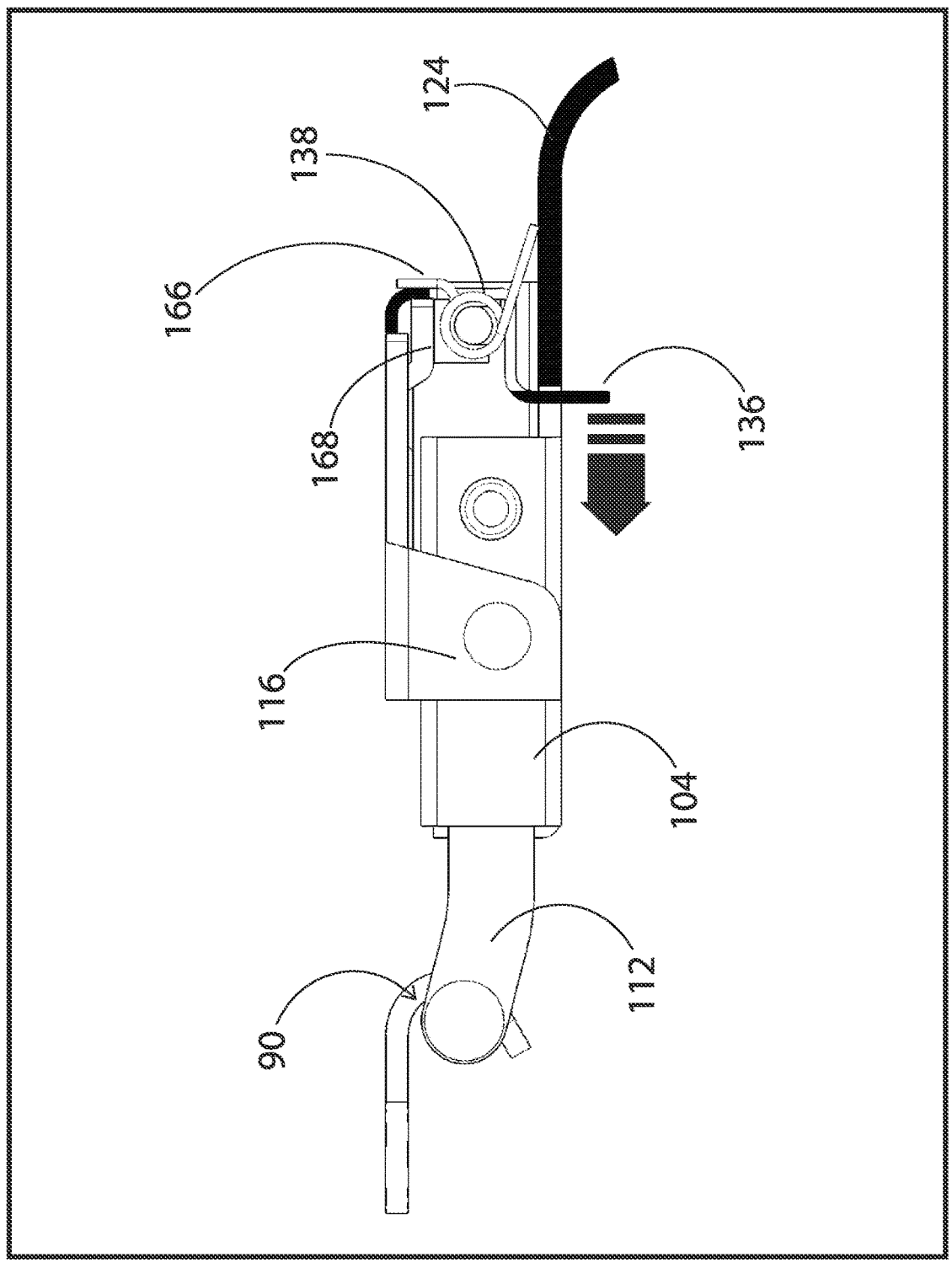
FIGS. 10B, 11B, 12B, 13B, 14B and 15B are top sectional views illustrating the operation of the locking assembly of FIG. 5.
Figure 10C:
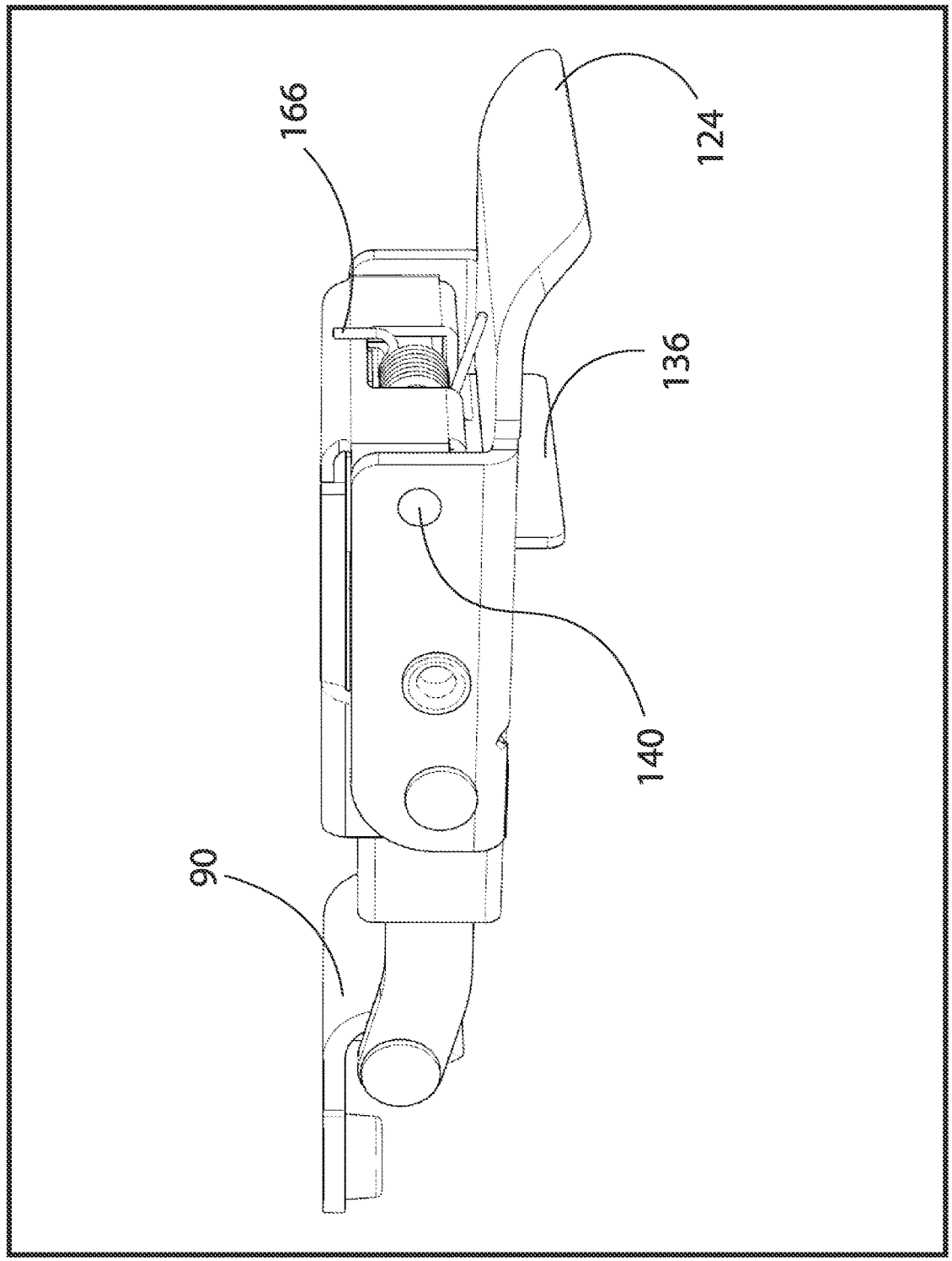
FIG. 10C is a different perspective view of the locking assembly of FIG. 5.
Figure 10D:
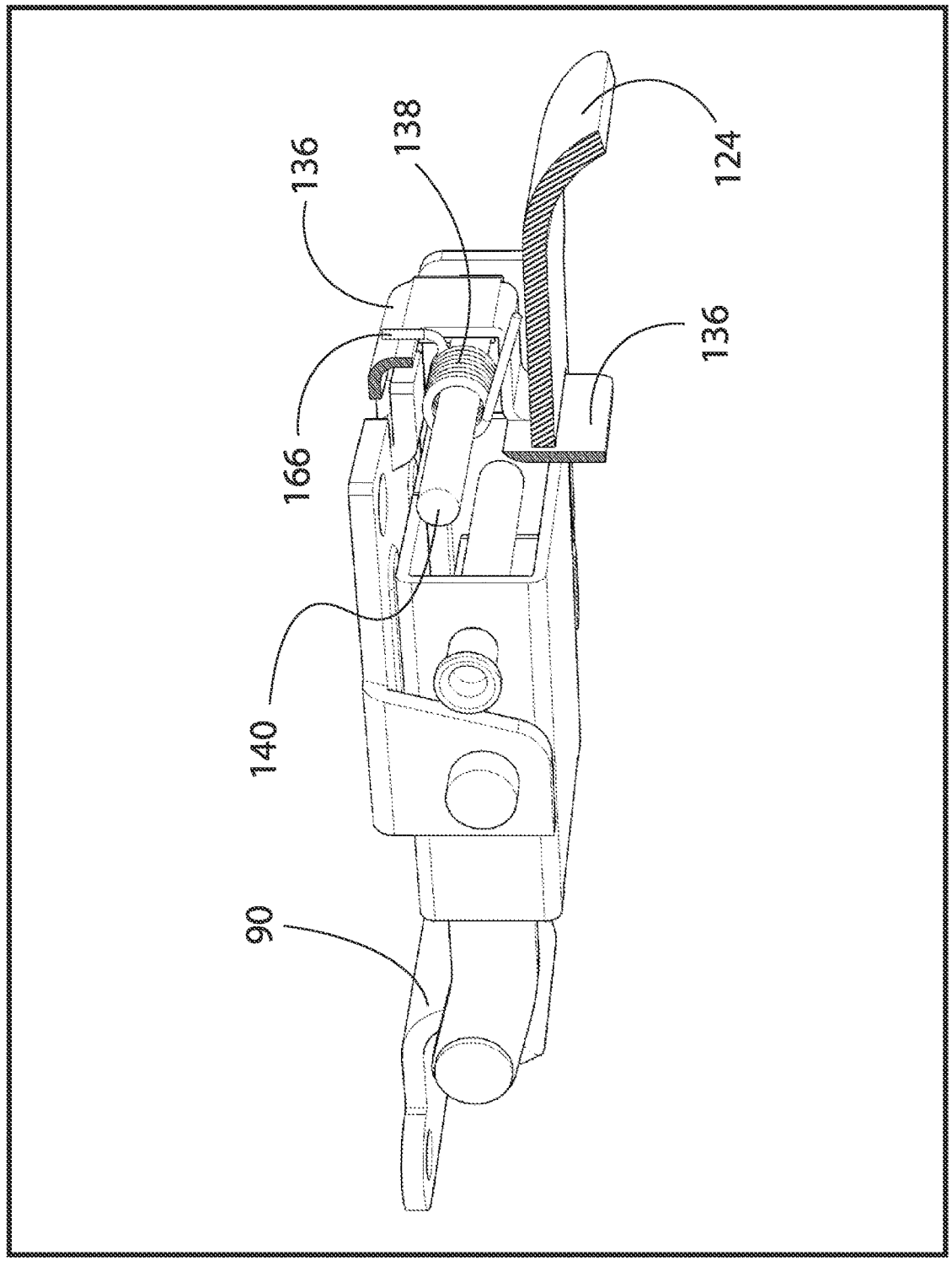
FIG. 10D is a cut-away view of FIG. 10C.
Figure 11A:
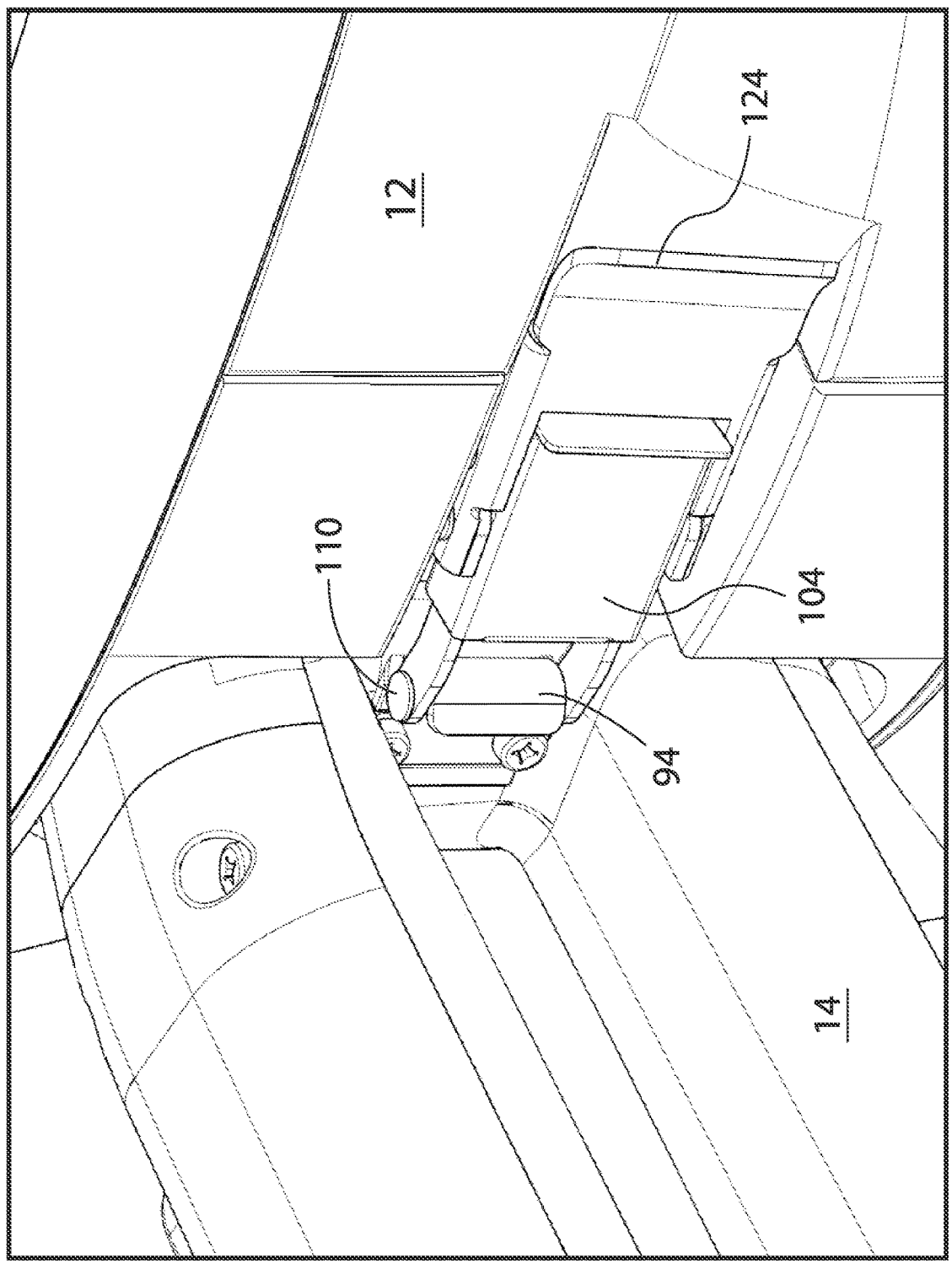
Figure 11B:
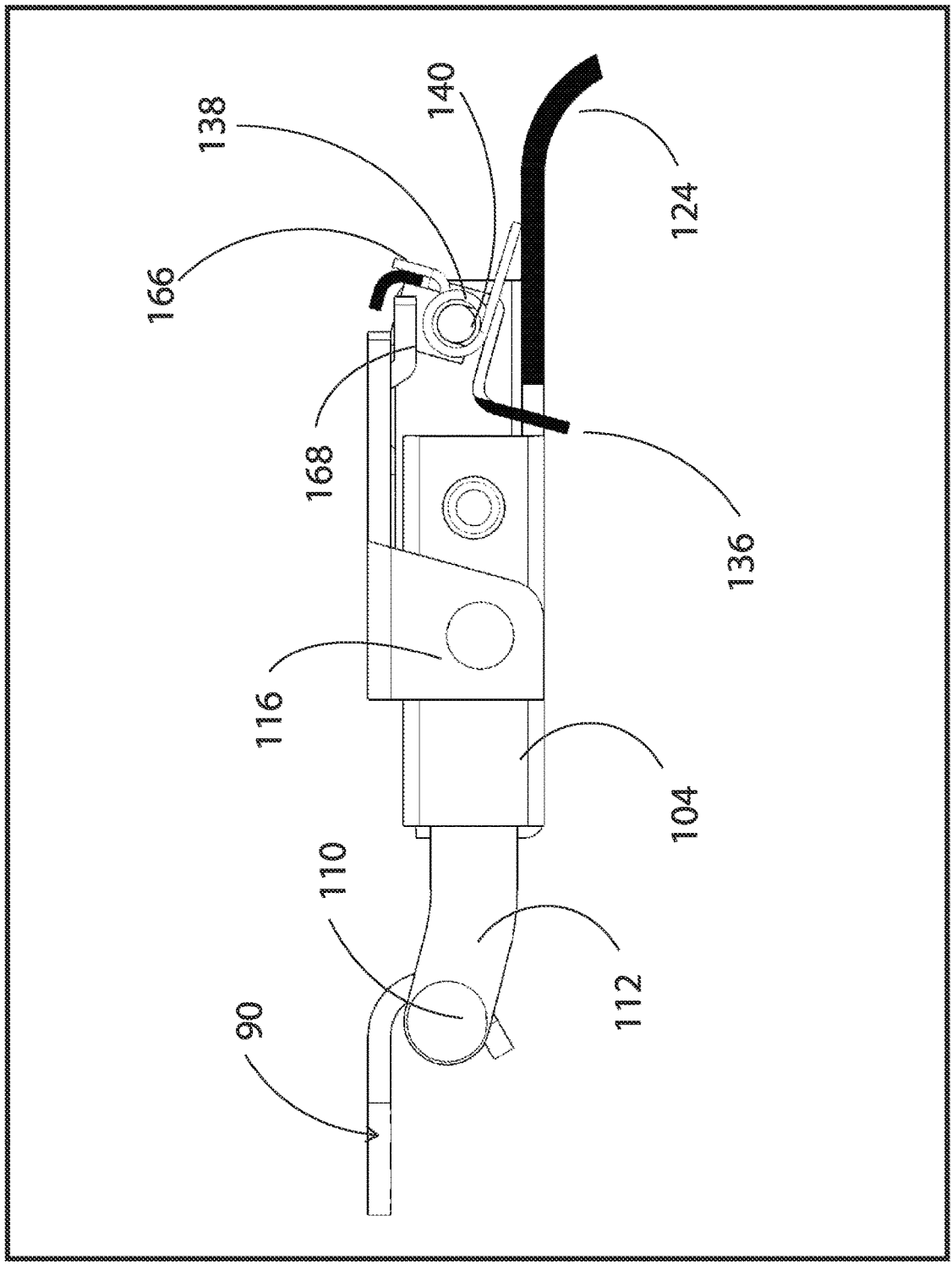

Referring to FIG. 9, the side plate 118 is secured to the main body 12 via screws 160 that extend through openings 162 in the side plate 118.

Figure 5:
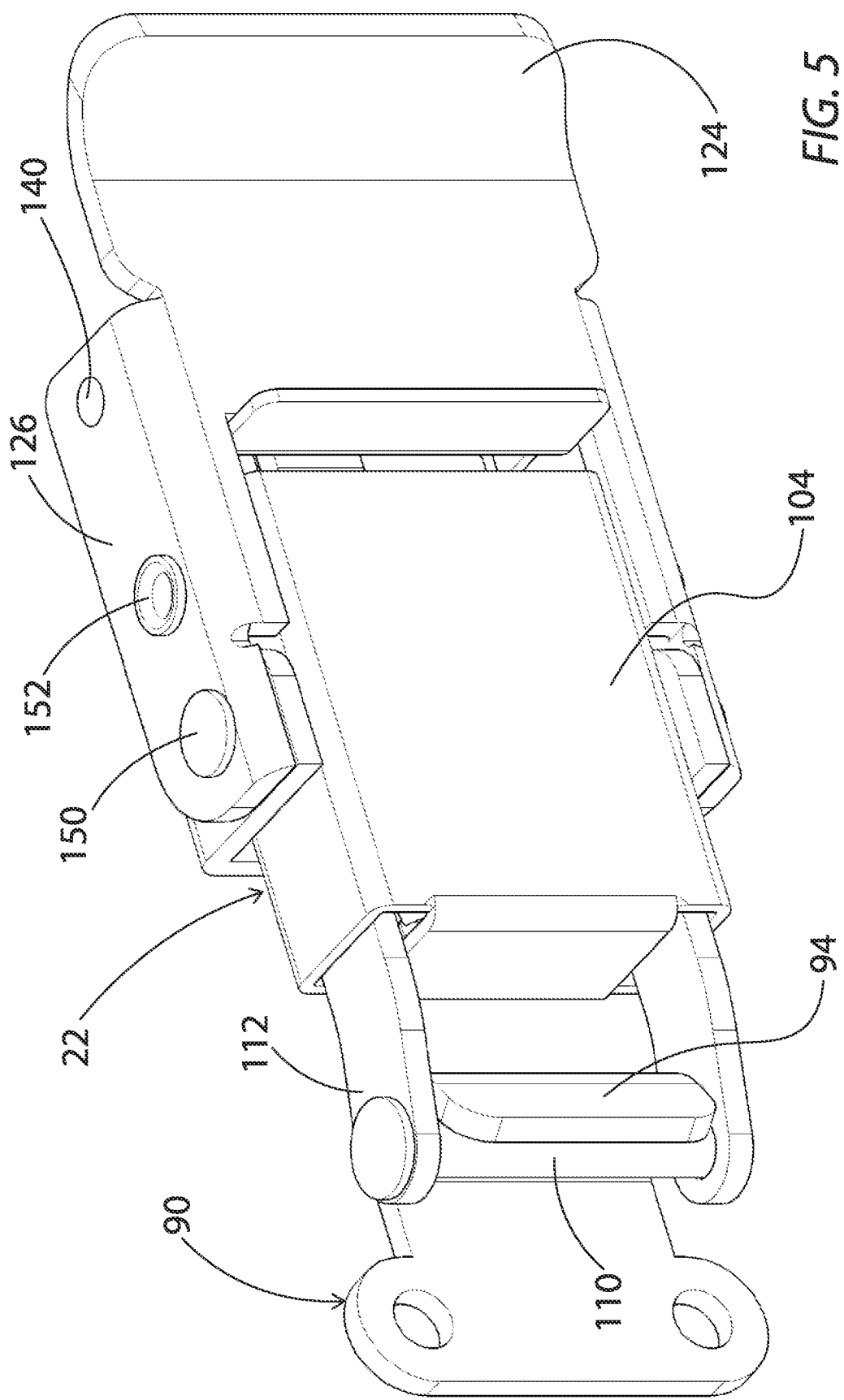
FIG. 5 is a perspective front view of a locking assembly that can be used with the underwater motive device of FIG. 1.
Figure 6:
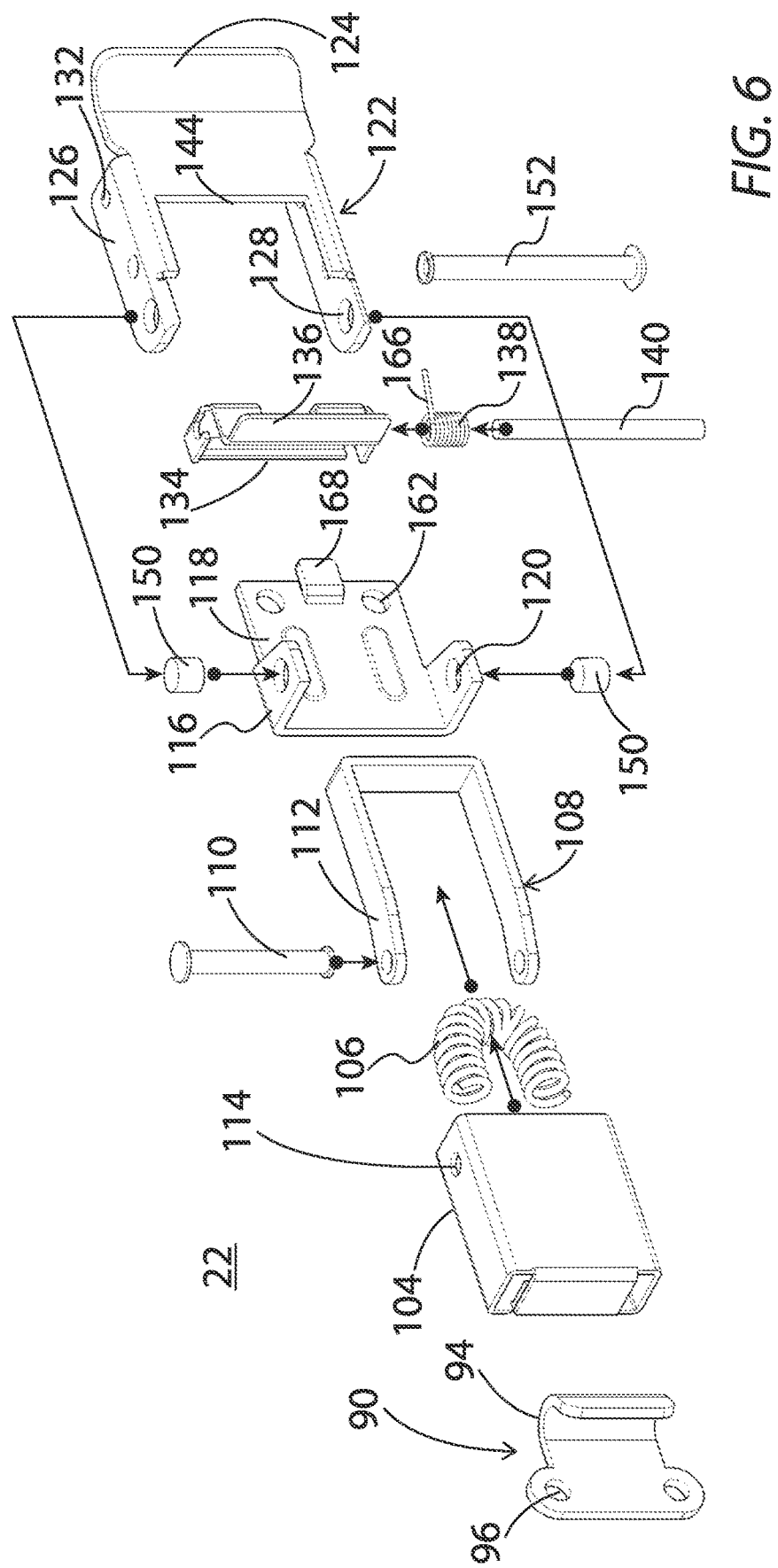
FIG. 6 is exploded perspective view of the locking assembly of FIG. 5.

Referring to FIG. 5, when fully assembled, the box 104 sits inside a space defined by the side plate 118 and the wings 126. The spring 106 functions to bias the latch pin 110 to normally pull the catch 94 of the hook 90 to maintain the locking assembly 22 in the locked position. In addition, the latch 122 can pivot separately versus both the side plate 118 (via the lock bolts 150) and the box 104 (via the latch pivot pin 152).

FIGS. 10A-15B illustrate the operation of the locking assembly 22 with respect to the arm 14. The other arm 18 can be locked and released in the same manner with the other locking assembly 22. Starting with FIGS. 10A-10D, these two FIGS. show the arm 14 opened in a deployed (for use) configuration of FIG. 1, with the hook 90 locked by the latch pin 110, and an end 166 of the torsion spring 138 normally biased to engage a hook 168 on the side plate 118. When it is desired to fold the arm 14, the first step is to press and release the safety lock (i.e., the end 166 engaging the hook 168), where user can push the flange 136 towards the hook 90 against the normal bias of the spring 166, which also causes the lock piece 134 to pivot about the latch pivot pin 140 so that the lock piece 134 can be disengaged from the hook 168. See FIGS. 11A and 11B, which show the safety lock released.

Figure 12A:
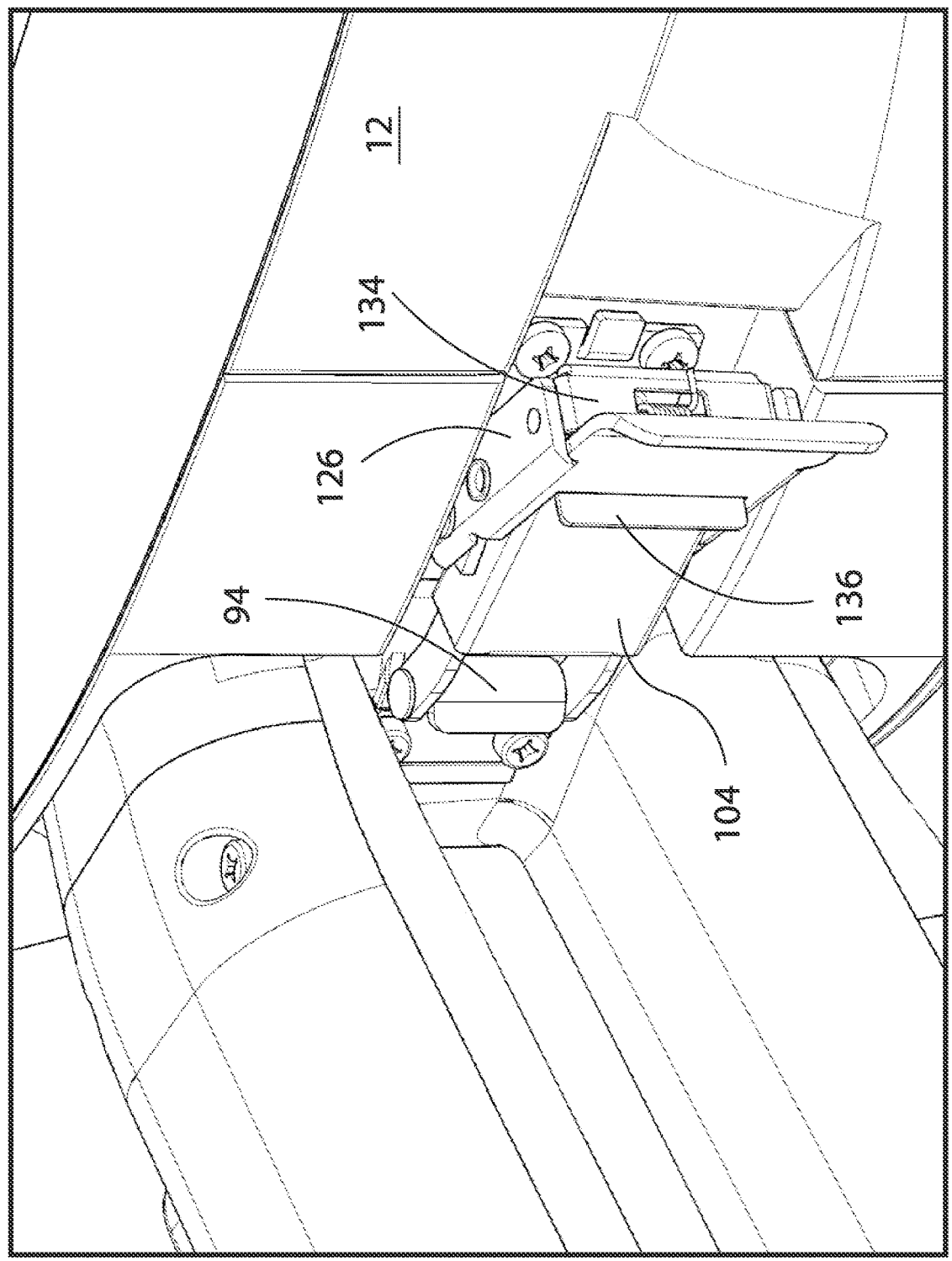
Figure 12B:
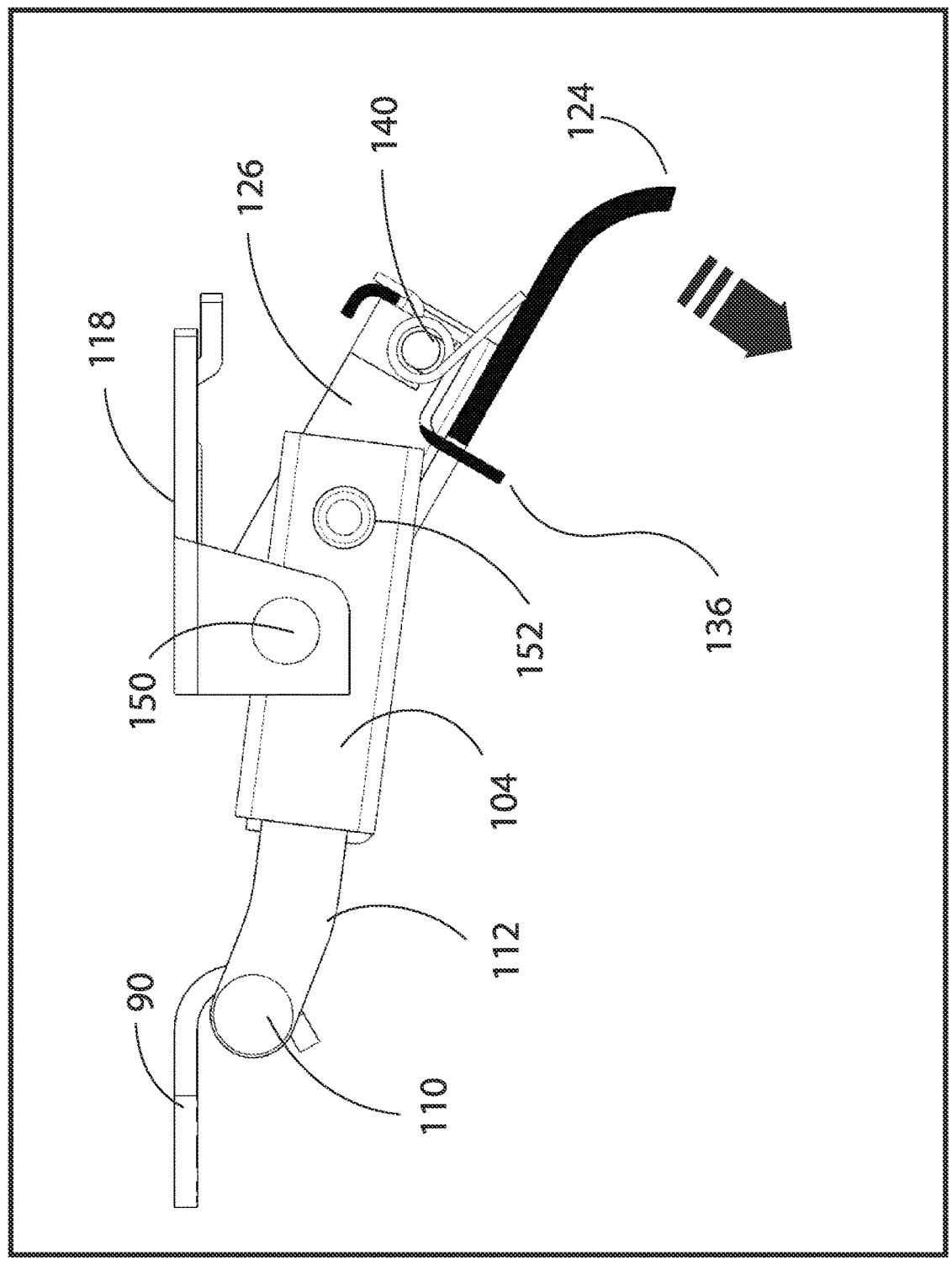

The next step is to pull the latch 122. As shown in FIGS. 12A and 12B, the handle plate 124 can be pull or pivoted outwardly away from the main body 12 in a manner such that (i) the latch 122 pivots with respect to both the box 104 (via the latch pivot pin 152) and the side plate 118 (via the lock bolts 150), and (ii) the box 104 pivots with respect to both the side plate 118 (via the lock bolts 150) and the latch 122 (via the latch pivot pin 152). As shown in FIG. 12B, the arms 112 also pivot with respect to the hook 90 about the pivot defined by the latch pin 110.

Figure 13A:
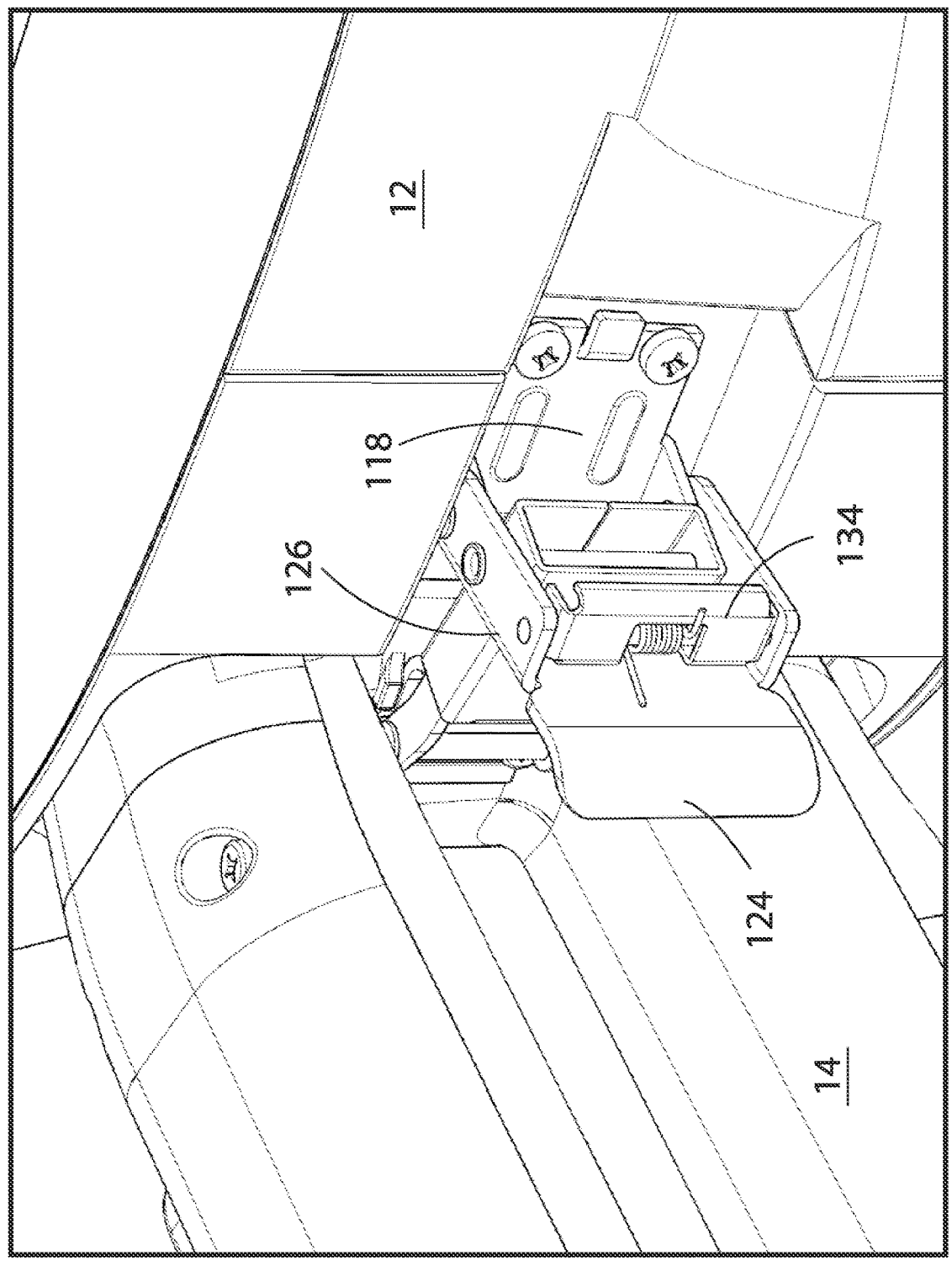
Figure 13B:
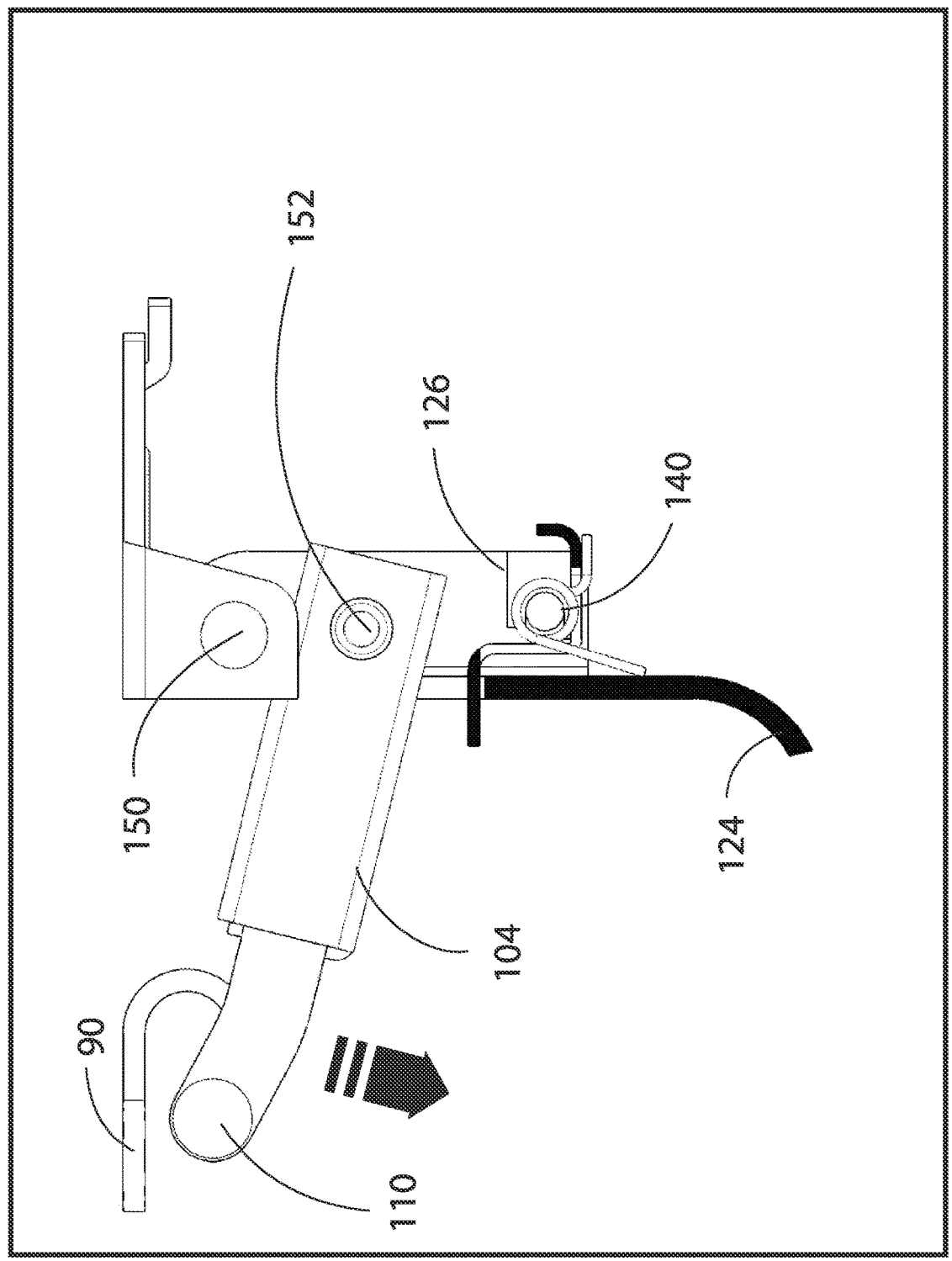

The next step is to release the lock (i.e., the latch pin 110) from the hook 90. Referring to FIGS. 13A and 13B, when the handle plate 124 of the latch 122 is pulled to be transverse with the main housing 12, the latch pin 110 is disengaged from the overturned side 94 of the hook 90.

Figure 14A:
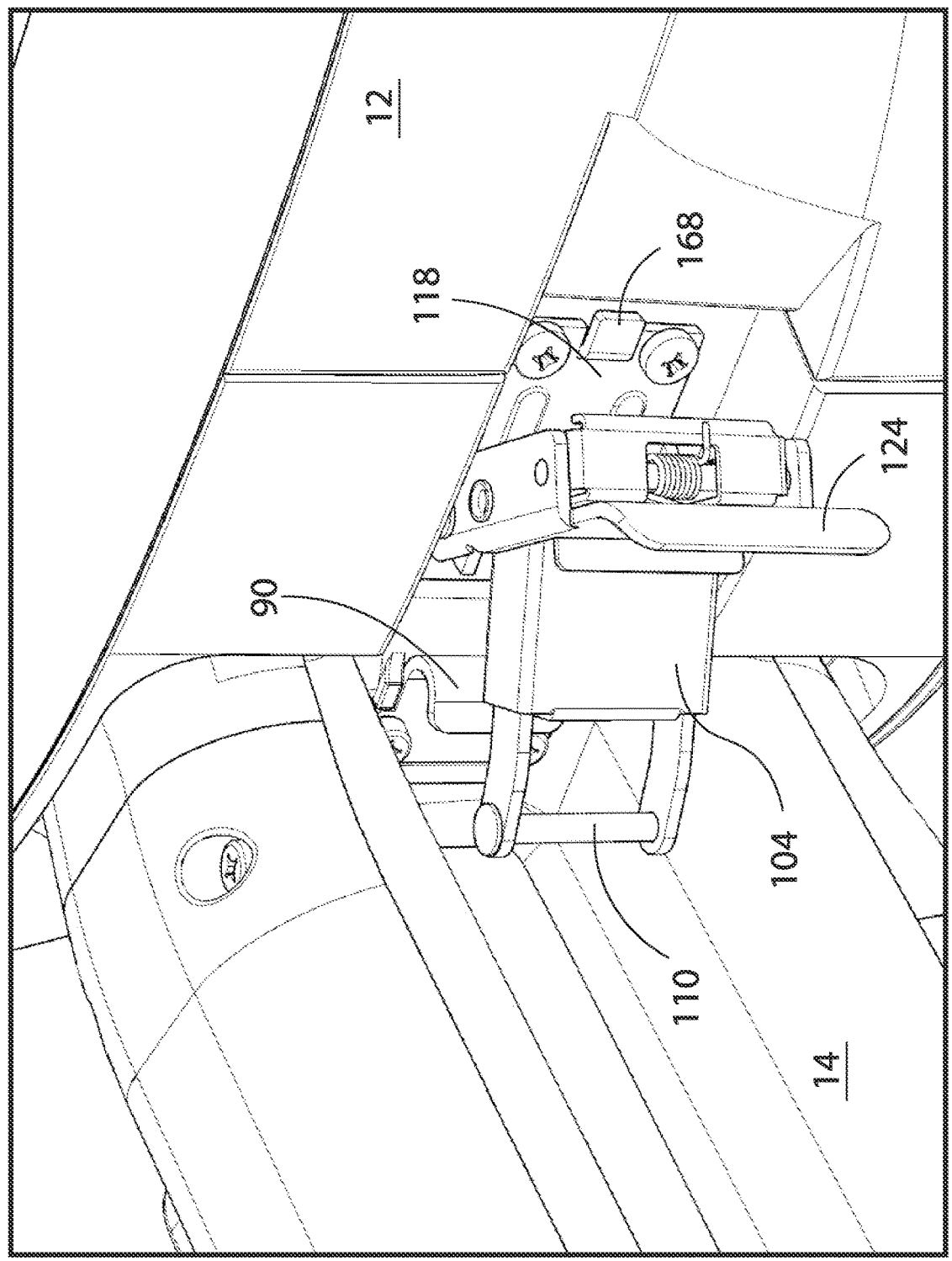
Figure 14B:
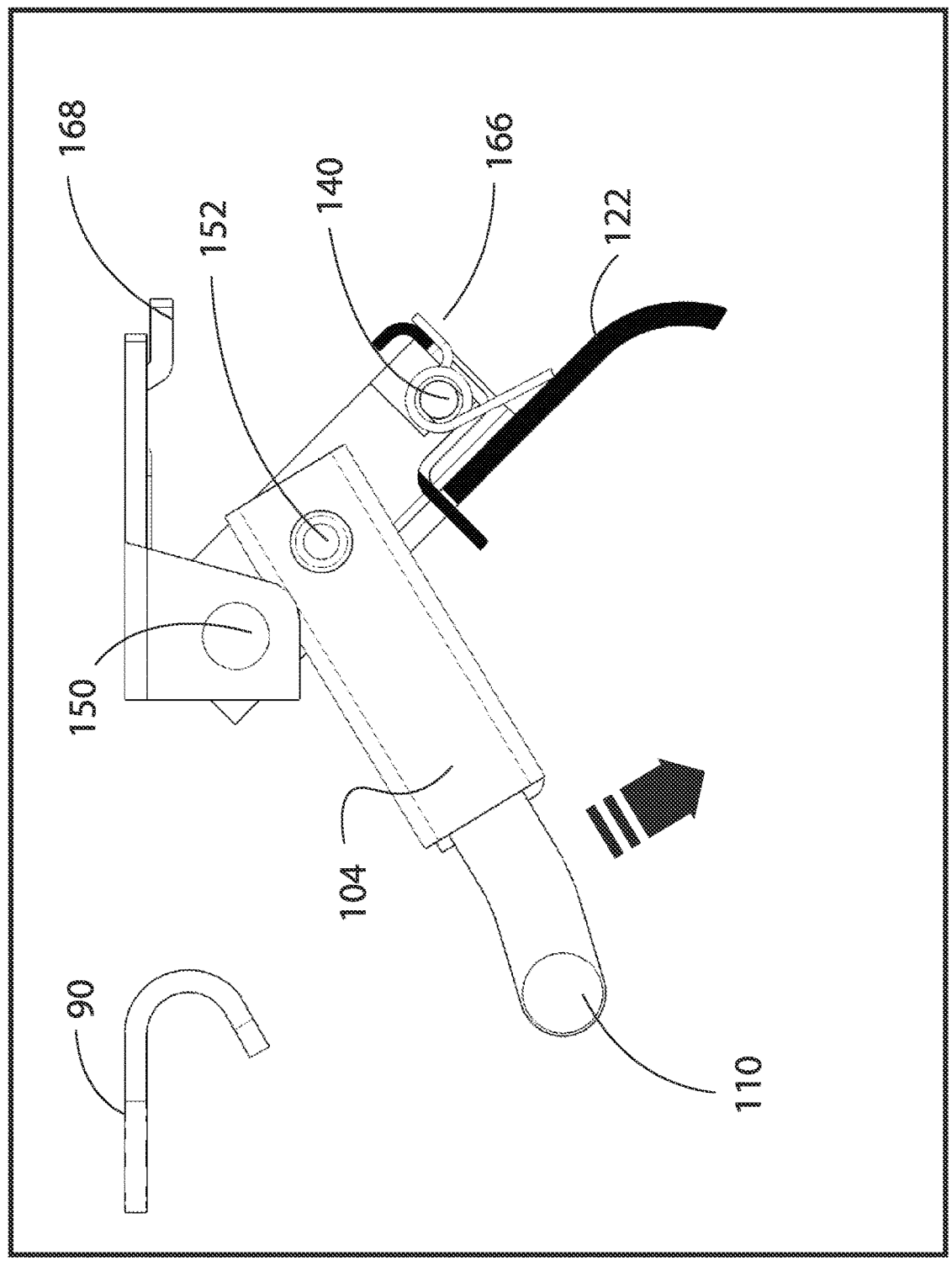
Figure 15A:
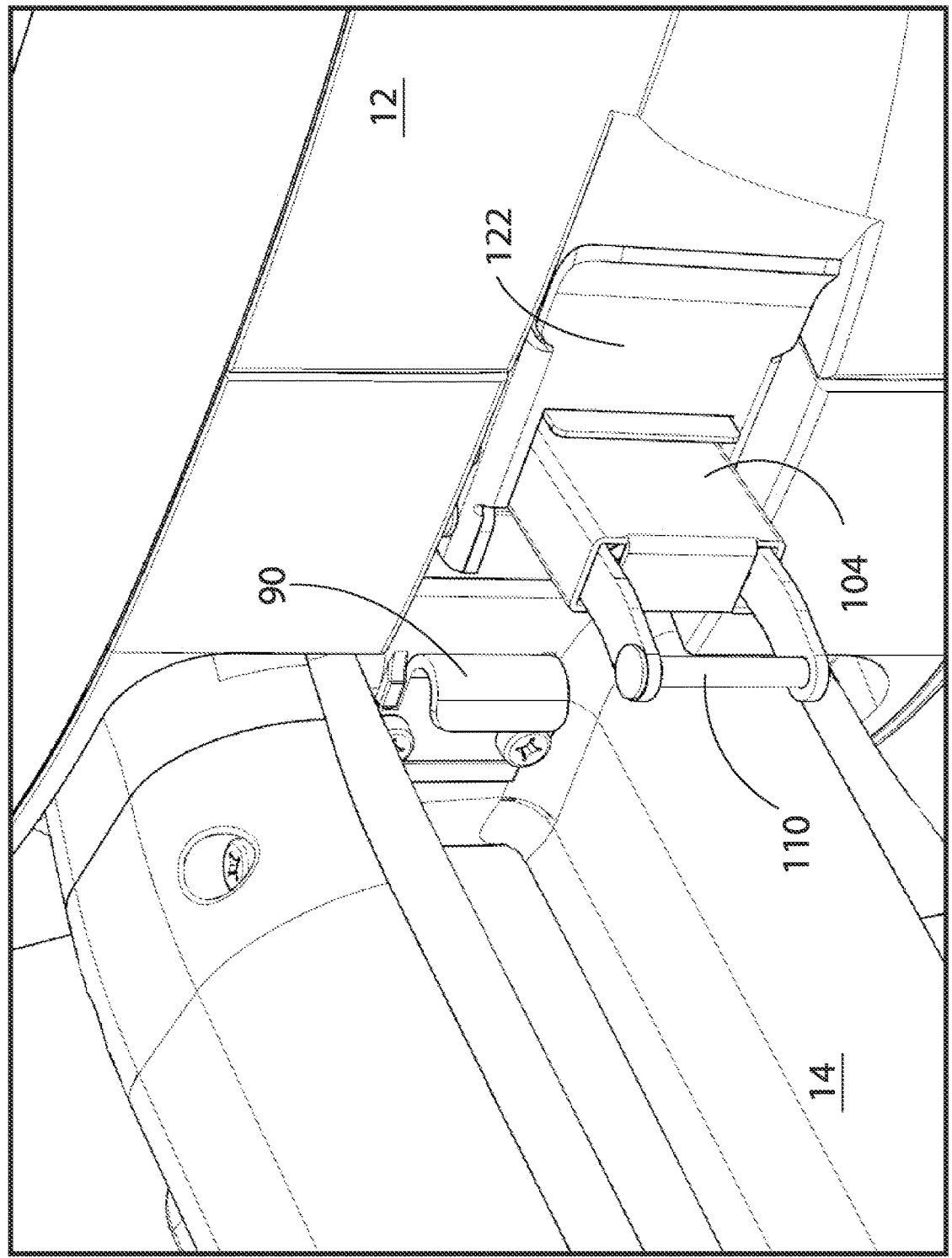
Figure 15B:
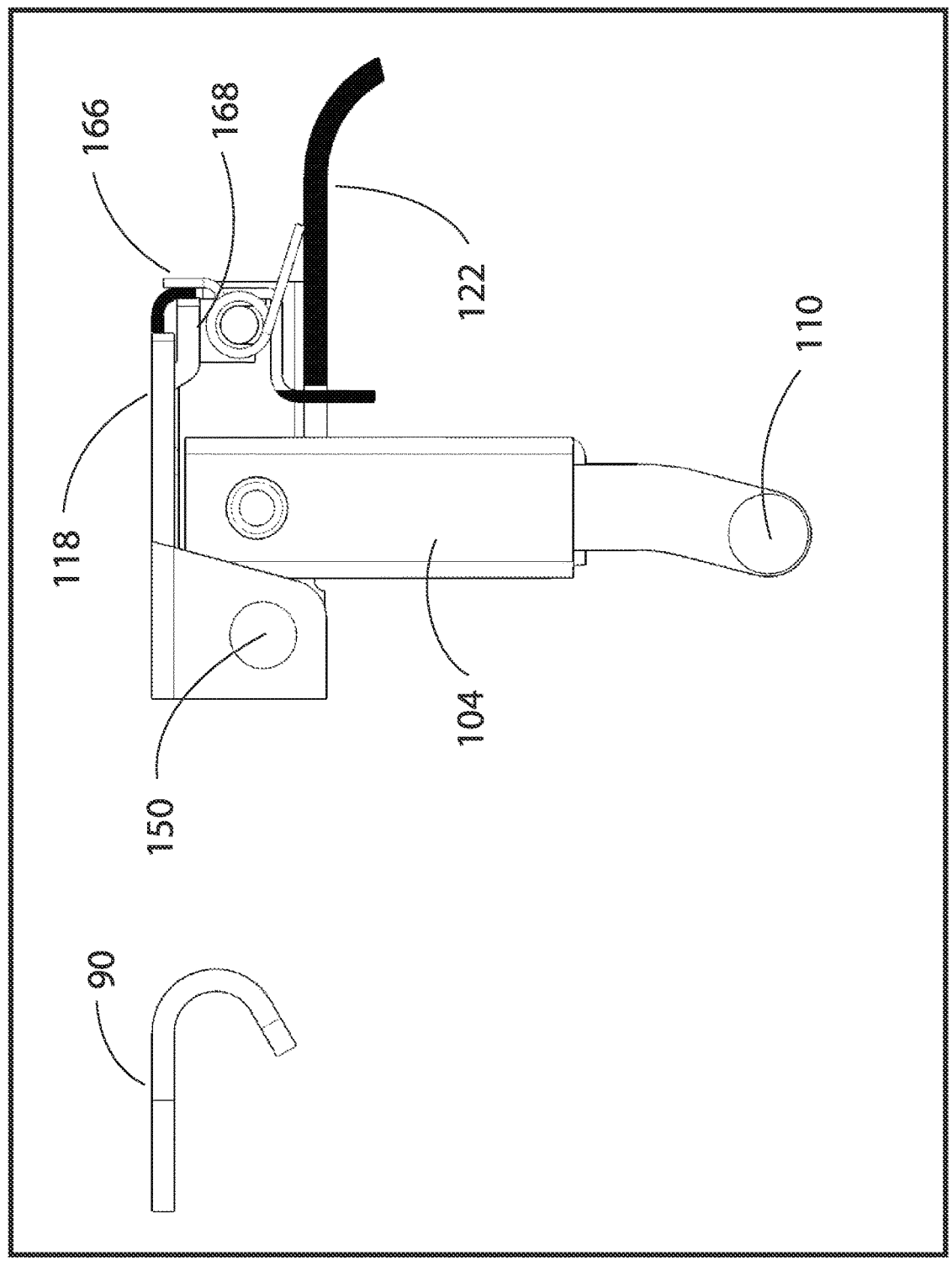

Referring now to FIGS. 14A and 14B, the entire buckle 92 can now be pulled backwards and pivoted towards the side plate 118 in a manner such that (i) the latch 122 pivots with respect to both the box 104 (via the latch pivot pin 152) and the side plate 118 (via the lock bolts 150), and (ii) the box 104 pivots with respect to both the side plate 118 (via the lock bolts 150) and the latch 122 (via the latch pivot pin 152). At this time, the arm 14 can be folded towards the other arm 18. FIGS. 15A and 15B show the maximum extent to which the box 104 can be pivoted.

Figure 2:
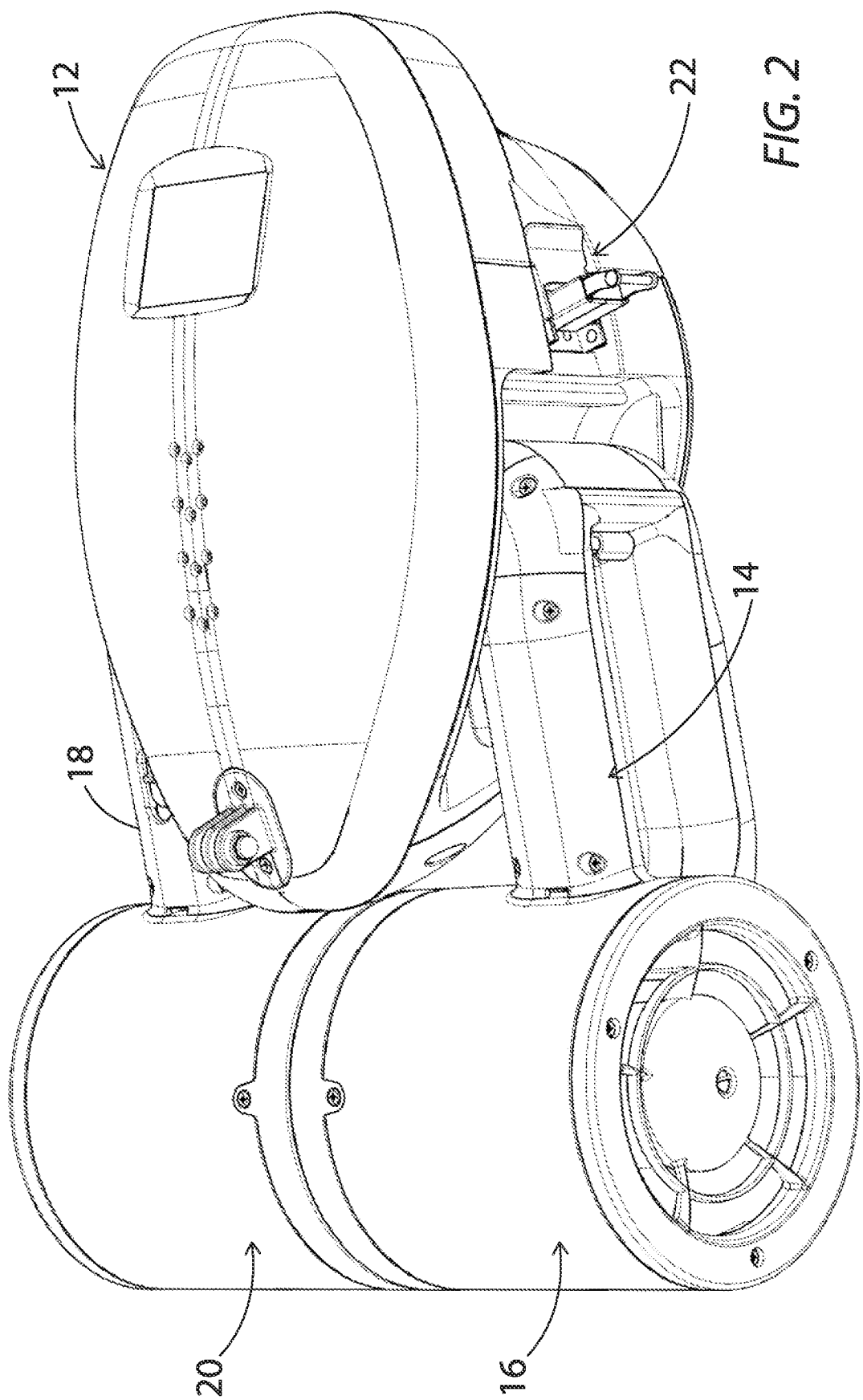
FIG. 2 is a perspective view of the underwater motive device of FIG. 1 shown in the folded configuration.
Figure 3:
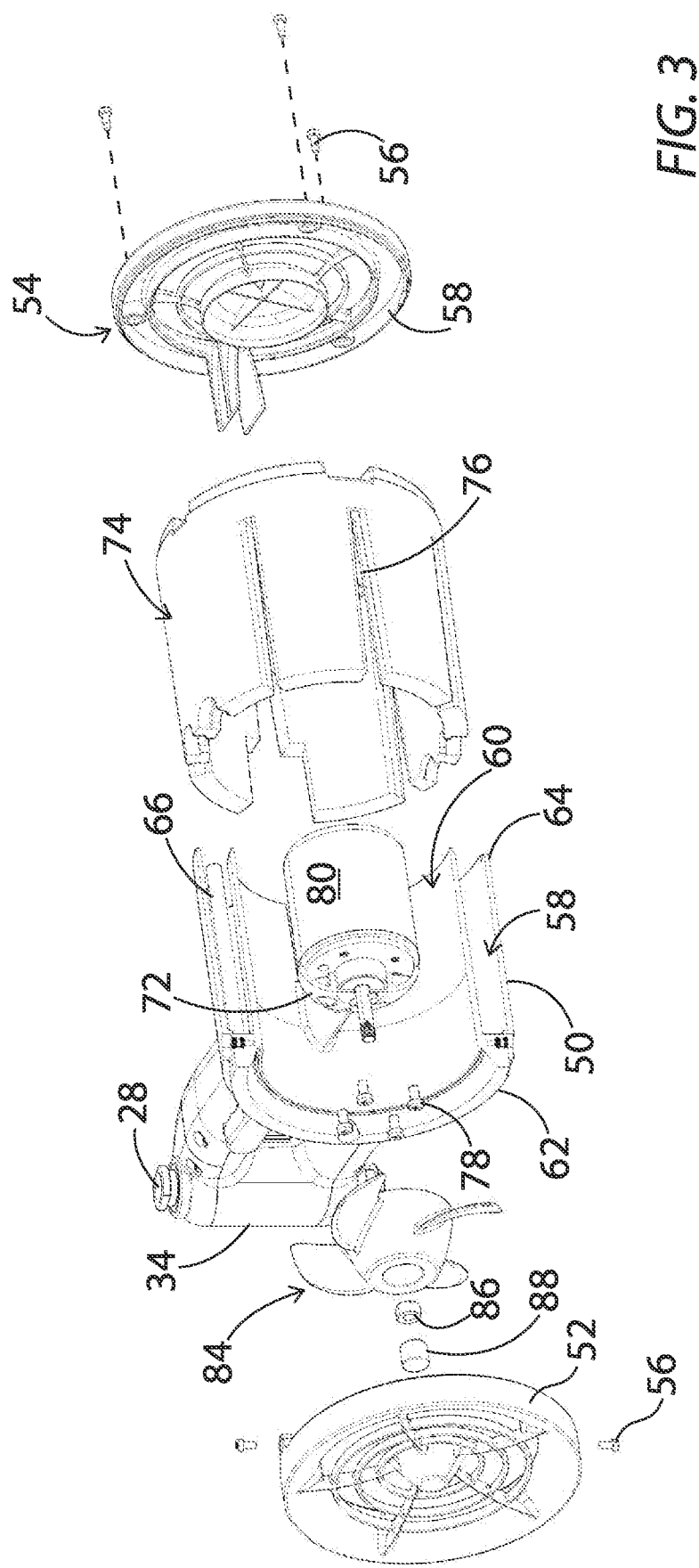
FIG. 3 is an exploded front perspective view of a portion of one barrel of the underwater motive device of FIG. 1.
Figure 4:
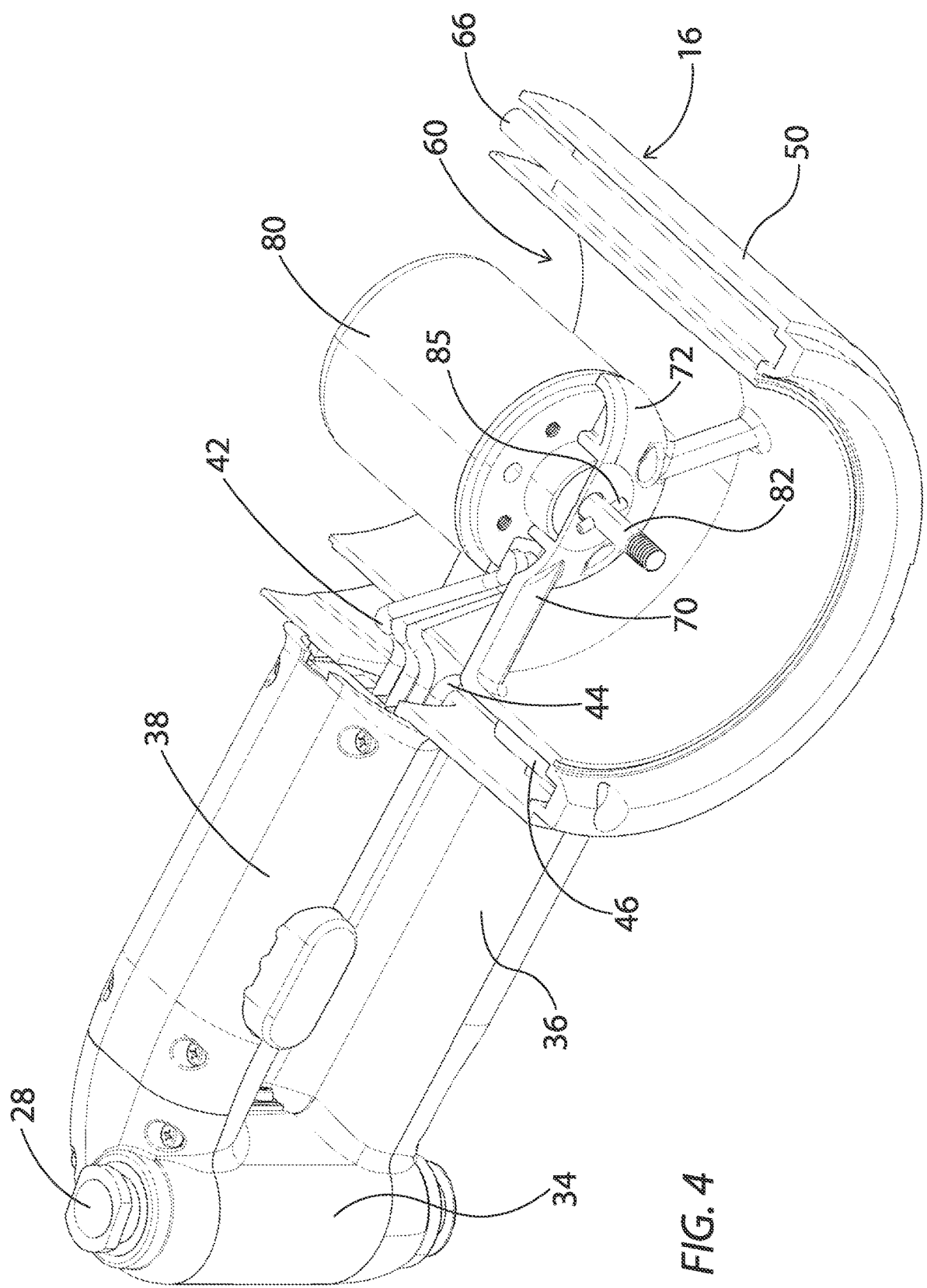
FIG. 4 is a top front perspective view of the barrel of FIG. 3 shown partially assembled.

The two arms 14 and 18 can be folded together so that the two barrels 16 and 20 can be brought together and held together by the magnets 88 in the folded configuration, as shown in FIG. 2. This folded configuration allows the sea scooter 10 to assume a compact and small configuration that is convenient for storage and transportation.

When it is desired to unfold the arms 14 and 18 for use of the sea scooter 10, the locking assembly 22 can be unlocked by pushing the flange 136 again to disengage the lock piece 134 from the hook 168. The arm 14 can be unfolded and then the buckle 92 pivoted so that the latch pin 110 is moved towards the hook 90 and engages the hook 90 to reach the deployed configuration shown in FIGS. 10A and 10B.

Figure 16:
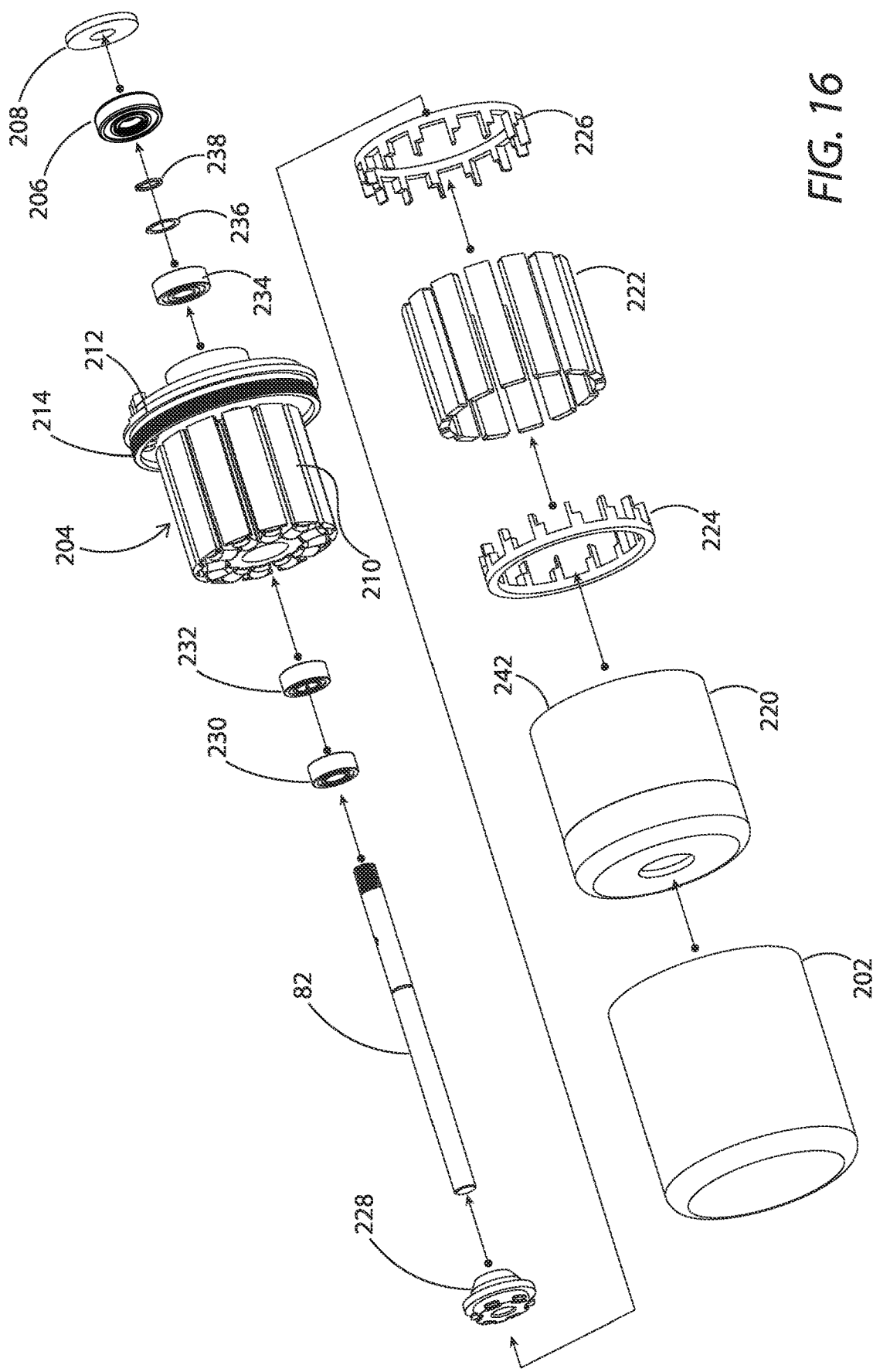
FIG. 16 is an exploded perspective view of a waterproof motor according to one embodiment of the present embodiment.
Figure 17:
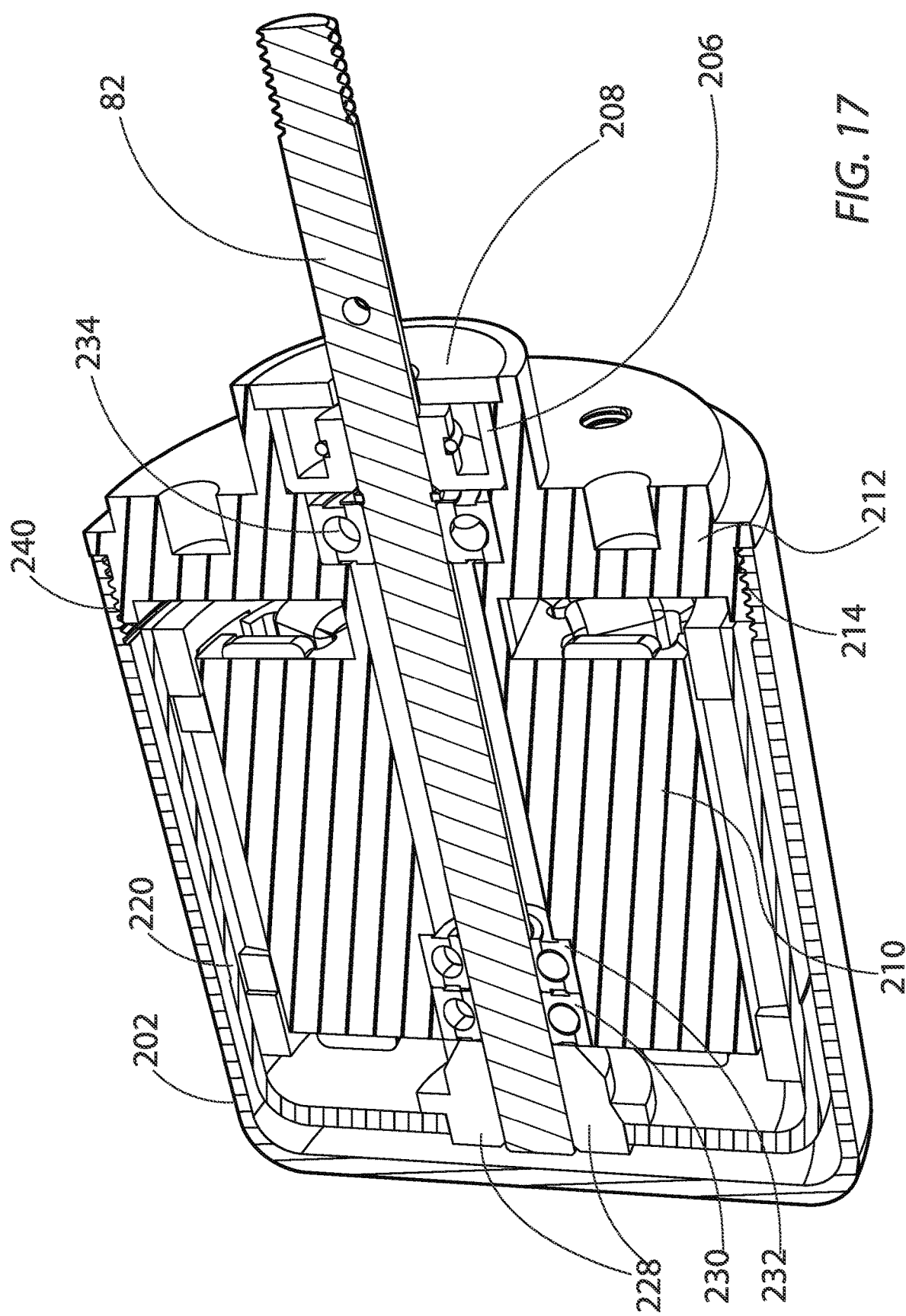
FIG. 17 is a cross-sectional view of the motor of FIG. 16.

FIGS. 16 and 17 illustrate a waterproof motor 80 that can be used in connection with the sea scooter 10 of the present invention, or with other devices that are operated underwater. The motor 80 is designed to be both water-proof and sand-proof. In particular, the motor 80 provides a novel skeleton seal 206 and a motor sealing case that provide the requisite tight seal need to keep sand and water out of the motor 80.

The motor 80 has a group of stationary components and a group of rotary components that are adapted to rotate together. The stationary components include a sealing case 202, a stator 204, the skeleton seal 206 and a front cap 208. The stator 204 has a circular platform 212 which has external threads 214 provided along the annular outer lip of the platform 212. Stator teeth 210 extend from the platform 212. The skeleton seal 206 is positioned at the top of the stator 204.

The rotary components include a rotor case 220, rotor magnets 222, a bottom bracket 224, a top bracket 226, a motor shaft base 228, the motor shaft 82, a pair of center bearings 230, 232, a front bearing 234, a washer 236 and a C-clip 238. Part of the bearings 230, 232 and 234 are stationary and part of the bearings 230, 232 and 234 will rotate with the rotary components. The rotor case 220 is retained inside the sealing case 202 and encircles the stator 204. The motor shaft 82 is carried on the motor shaft base 228, and extends through the bearings 230, 232, 234, the stator 204, the washer 236, the C-clip 238, the skeleton seal 206 and the front cap 208. The rotor magnets 222, the bottom bracket 224, and the top bracket 226 are retained inside the rotor case 220.

The upper lip of the sealing case 202 is adapted to form a glue connection 240 with the external threads 214 provided along the annular outer lip of the platform 212 to form a motor sealing case. The glue connection 240 provides a tight seal that is both water-proof and sand-proof. In a conventional brushless motor without the sealing case 202, water and sand can enter through a gap defined between the upper lip 242 and the bottom annular lip of the platform 212. The glue connection 240 forms a sealed chamber with the sealing case 202 to prevent water and sand from entering.

Figure 18:
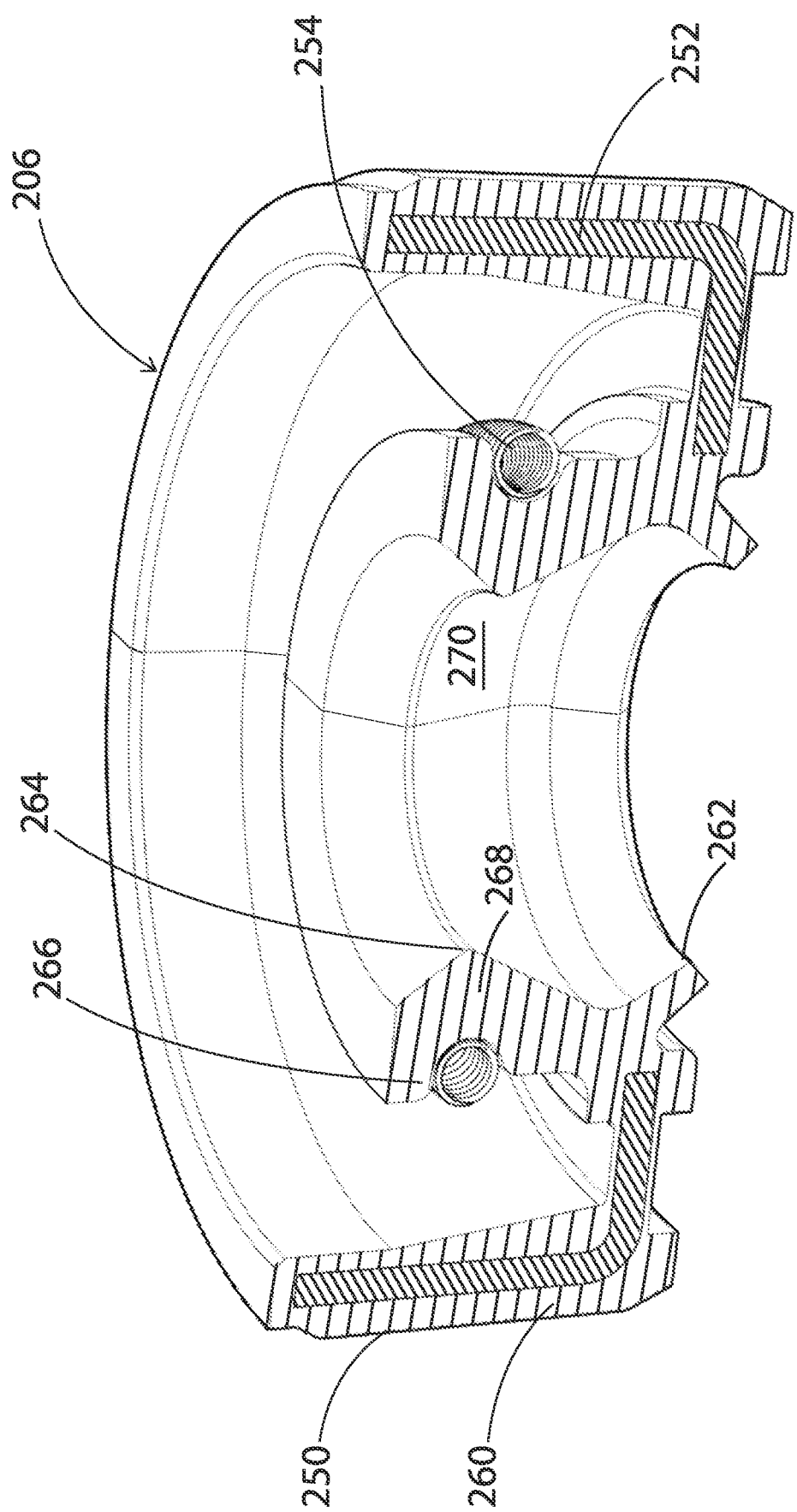
FIG. 18 is a cross-sectional view of the skeleton seal of the motor of FIG. 16.

Referring now to FIG. 18, the skeleton seal 206 (also known as a reinforced seal) has three parts: a sealing part 250, a reinforced metal frame 252, and a self-tightening coil spring 254. The sealing part 250 has an annular outer body 260, and an annular inner lip 268. The annular inner lip 268 includes an outer dust/sand primary lip seal 262 that faces the front cap 208, a main lip seal 264 that extends inwardly into the channel 270 defined by the inner lip 268, and a spring retaining lip 266 that defines a groove for retaining the coil spring 254. The outer body 260 can be made of rubber. The motor shaft 82 is adapted to extend through the channel 270, and the lip seals 262 and 264 provide another tight seal that is both water-proof and sand-proof.

The inner diameter of the inner lip 268 is made to be smaller than the diameter of the motor shaft 82 and provides a certain amount of interference. The pressure of this interference fitting and the contraction force of the coil spring 254 seal the motor shaft 82 by a radial tightening force. This radial tightening force, after a period of operation, will quickly decrease or even disappear, so the coil spring 254 can compensate the radial tightening force to keep the motor shaft 82 tightly sealed. The reinforced metal frame 252 is seated inside the outer body 260, provides the necessary strength for the sealing part 250 and prevents water from entering into the sealed containment of the motor 80.

Thus, the present invention provides a sea scooter 10 that can be folded to minimize its overall size. The present invention also provides a waterproof motor 80 that is effective in preventing water from entering the interior.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A sea scooter, comprising:
    a main housing having a left side and a right side;
    a left arm pivotably attached to the left side of the main housing;
    a right arm pivotably attached to the right side of the main housing;
    a left barrel secured to the left arm;
    a right barrel secured to the right arm;
    a first locking assembly that locks the left arm against the left side of the main housing;
    a second locking assembly that locks the right arm against the right side of the main housing;
    wherein each barrel has a fan and a motor for propelling the sea scooter through water; and
    wherein the left and right arms are locked by the first and second locking assemblies into a folded configuration against the left and right sides of the main housing when the sea scooter is not in use, and the left and right arms are pivoted away from the left and right sides of the main housing in a use configuration when the sea scooter is in use in the water.

2. The sea scooter of claim 1, wherein the left barrel further includes a connecting mechanism that removably connects the left barrel to the right barrel.

3. The sea scooter of claim 1, wherein each locking assembly comprises:
    a hook that is secured to the corresponding left or right arm, the hook having a catch;
    a buckle that is secured to the main housing, the buckle having:
        a latch that engages and disengages the catch; and
        a lock lever having a side plate that is fixedly secured to the main housing, a lock piece that is coupled to and pivotable with respect to the side plate, and a handle plate that is coupled to and pivotable coupled with respect to the side plate, the lock piece and the latch.

4. The sea scooter of claim 3, wherein the side plate has a hooking lock that is engaged by the lock piece to lock the handle plate against the side plate.

5. The sea scooter of claim 4, wherein the lock piece includes a torsion spring that engages the hooking lock.

6. The sea scooter of claim 1, wherein the motor comprises:
    a group of stationary components including a sealing case, a stator, a skeleton seal and a front cap, wherein the stator has a circular platform which has external threads provided along the annular outer lip of the platform, and the skeleton seal at positioned at an outer facing end of the stator; and
    a group of rotary components including a rotor case that is retained inside the sealing case, a motor shaft base that is secured to the rotor case, a motor shaft carried on the motor shaft base, and a plurality of bearings, and wherein the sealing case has an upper lip, and wherein a glue connection is formed at the upper lip with the internal threads.

* * * * *